US005822083A

United States Patent [19]

Ito et al.

[11] Patent Number: 5,822,083
[45] Date of Patent: Oct. 13, 1998

[54] IMAGE STORING APPARATUS

[75] Inventors: Masahiko Ito, Yokohama; Yoshihiro Saito, Hachioji; Yasuhiro Yamamoto, Yokohama, all of Japan

[73] Assignee: Canon Kabushiki Kaisha, Tokyo, Japan

[21] Appl. No.: 819,816

[22] Filed: Mar. 18, 1997

Related U.S. Application Data

[63] Continuation of Ser. No. 527,100, Sep. 12, 1995, which is a continuation of Ser. No. 128,771, Sep. 30, 1993.

[30] Foreign Application Priority Data

Oct. 2, 1992 [JP] Japan .................................. 4-289636
Oct. 2, 1992 [JP] Japan .................................. 4-289637

[51] Int. Cl.⁶ .................................................. H04N 1/00
[52] U.S. Cl. ........................ 358/403; 358/444; 358/434
[58] Field of Search ................................. 358/540, 514, 358/526, 403, 467, 468, 442, 443, 404, 444, 448; 355/200, 209; 379/100, 100.1; 380/18; 382/317

[56] References Cited

U.S. PATENT DOCUMENTS

| | | | |
|---|---|---|---|
| 4,417,282 | 11/1983 | Yamamoto | 358/296 |
| 4,686,704 | 8/1987 | Kamada | 382/317 |
| 4,734,760 | 3/1988 | Futaki | 358/514 |
| 4,908,719 | 3/1990 | Nonoyama | 358/494 |
| 4,970,554 | 11/1990 | Rourke | 355/200 |
| 5,124,748 | 6/1992 | Tanabe et al. | 355/200 |
| 5,136,665 | 8/1992 | Inoue | 358/496 |
| 5,255,104 | 10/1993 | Kajigaya | 358/468 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image storing apparatus comprises reading unit for reading an original image, storing unit for storing the image from the reading unit, retrieving unit for retrieving the image stored in the storing unit in accordance with retrieval information, and printing unit for printing an image representing the retrieval information on the original.

27 Claims, 28 Drawing Sheets

ORIGINAL

PHOTOMAGNETIC DISK

IMAGE STORING APPARATUS

This application is a continuation of application Ser. No. 08/527,100 filed on Sep. 12, 1995, which is a continuation of application Ser. No. 08/128,771 filed on Sep. 30, 1993.

BACKGROUND OF THE INVENTION

1. Field of the Invention

The present invention relates to an image storing apparatus for storing an input image and retrieving a stored image.

2. Related Background Art

Recently, image storing apparatuses have been provided wherein an original image with retrieval information is input and stored and the stored image is retrieved with retrieval information.

In some companies or firms, there are often installed a plurality of image storing apparatuses which may be employed for each division or for each person, wherein the same original may be probably stored into several image storing apparatuses, such that retrieval information must be input into an apparatus every time an image is input into the apparatus, or different retrieval information may be input into each apparatus for the same original, resulting in time-consuming image input and troublesome retrieval processes.

Also, readers of this image storing apparatus have a limited readable size of originals, wherein when reading originals larger than that size, it is necessary to connect a the reader capable of reading such larger originals, but when some large originals are mixed in a series of small originals, the image storing apparatus can not recognize the order of originals which have been read by separate readers. Also, this image storing apparatus stores images in a detachable storage medium, but a person not knowing the purpose of a particular storage medium may store an image therein intended for a different purpose.

SUMMARY OF THE INVENTION

It is an object of the present invention to provide an image storing apparatus for solving the aforementioned problems.

Also, it is another object of the invention to provide an image storing apparatus wherein the input of retrieval information is made easier.

Also, it is a further object of the invention to provide an image storing apparatus wherein the order of images input separately can be recognized.

Also, it is a still further object of the invention to provide an image storing apparatus wherein the storage of images can be restricted.

Other objects and features of the present invention will be apparent from the following specification and the accompanying drawings.

DESCRIPTION OF THE PREFERRED EMBODIMENTS

Figure 1:
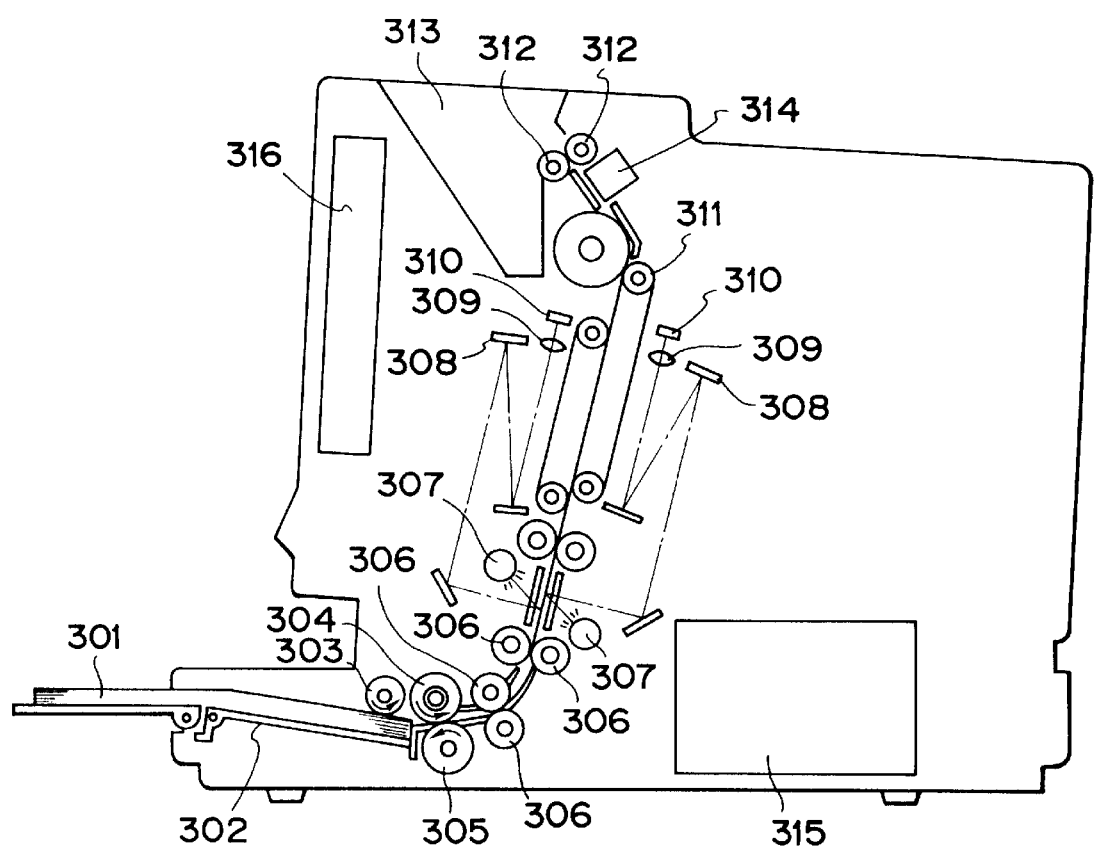
FIG. 1 is a schematic cross-sectional view illustrating an image storing apparatus according to the first embodiment of the invention.

FIG. 1 is a cross-sectional view illustrating the internal construction of an image storing apparatus according to the first embodiment of the present invention.

In the first embodiment, index information of an original to be stored is printed as a text on the original by a printer unit 314.

In FIG. 1, the operator lays down originals 301 on an original stacker board 302 and key-inputs an index of originals (retrieval information) through a keyboard (not shown), whereby upon depressing a start key, the image storing apparatus starts the feeding of originals.

First of all, originals 301 are fed by a feed roller 303 and separated at the next step by the combination of a sheet feed roller 304 and a separation roller 305 to pass only one sheet, which is then conveyed between rollers 306 to reach a reading unit.

Thereby, an original image illuminated by a lamp 307 is read via a mirror 308 and a lens 309 by a CCD 310.

Further, the original having passed through the reading unit is conveyed on a conveyance belt 331 to reach the printer unit 314, where index information (document name or document number) input previously is printed on the original, which is then exhausted into a sheet exhaust portion 313 by a sheet exhaust roller 312.

A storage unit 315 stores the read image provided with index information. The stored image is retrieved in terms of the index, and displayed on a display 316.

Herein, if the printer unit 314 is disposed upstream of the reading unit, the reading unit will read originals having index information printed, and there are stored no original images without additional information. In this case, if index information is overlapped on original images, it is impossible to restore the original images without additional information. However, if the printer unit 314 is disposed downstream of the reading unit, originals can be restored even if the image and index are overlapped, since a person who wants to store the originals can store original images having no index information printed thereon.

Figure 2:
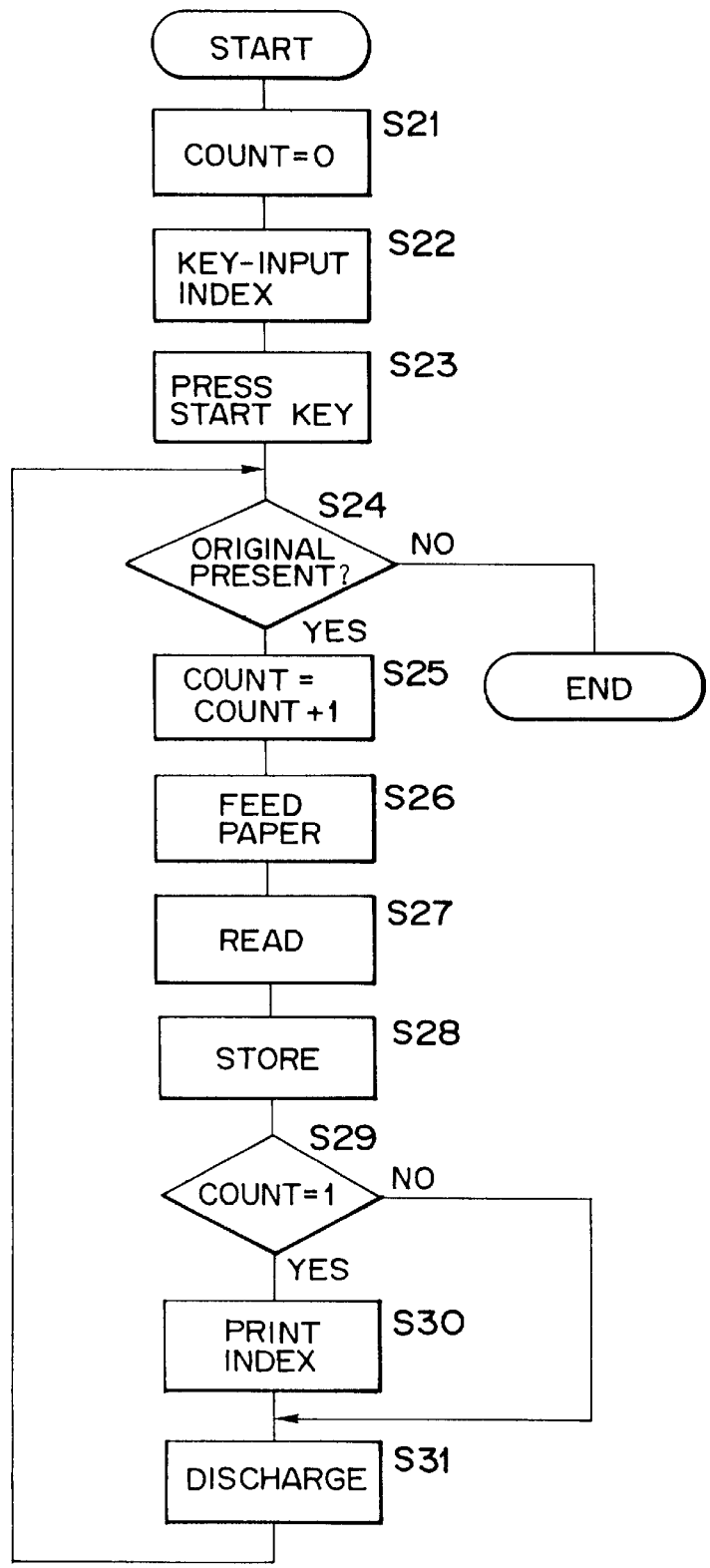
FIG. 2 is a flowchart illustrating the operation of the first embodiment.

FIG. 2 is a flowchart illustrating the operation of this embodiment.

First, a page counter COUNT is set to 0 at the initial setting (S21), and an index (document name or document number) is input by means of the keyboard (not shown) (S22). Upon depressing the start key (not shown) (S23), a check is performed to determine whether or not any original is present on the original stacker board (S24). If an original is confirmed, the page counter COUNT is incremented (S25), the feeding of the sheet is started (S26), the fed original is read (S27), an original image is stored (S28), where if the original is at the first page (S29), index information is also printed on the original (S30), the original is discharged (S31), and then the next original is read.

Note that when reading index information from the original having index characters printed in the above manner, it is recognized by an OCR or the like with which the reading unit can read the image. Thus, when an original once stored by one image storing apparatus is then restored into another image storing apparatus, the index information already on the original is recognized and stored therein, so that the effort of key-inputting index information can be eliminated.

While the above embodiment was described with a system in which index characters are printed and read by means of an OCR or the like, it is to be noted that a code system may be also employed to read such index information more correctly. Thus, index information can be input more correctly by converting kanji or kana for use in the document name into a bar code and printing it on the original.

Figure 3:
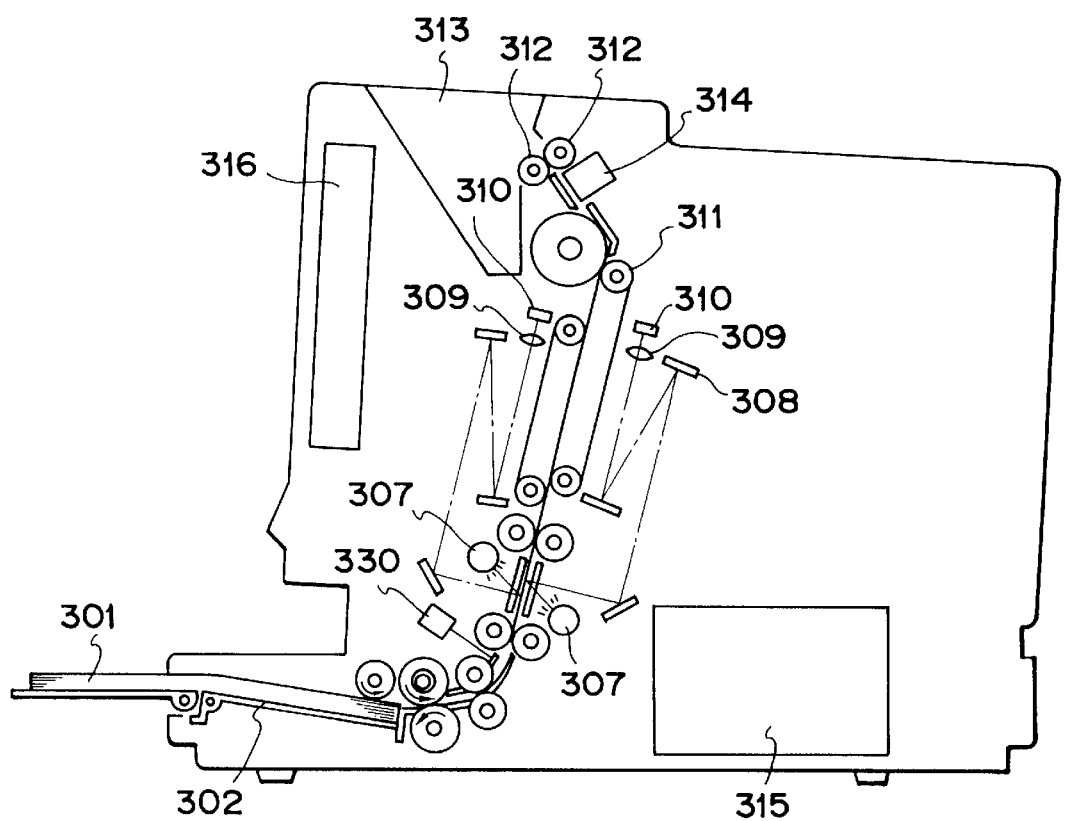
FIG. 3 is a schematic cross-sectional view illustrating an image storing apparatus according to the second embodiment of the invention.

Also, while the above embodiment was described with a reading unit for the original image to be commonly used to read the index, it is to be noted that an index reading unit 330 may be separately provided as illustrated in FIG. 3.

In this case, it is also possible to print an index mark which is readable as index information but not left behind in the image wherein the index reading unit 330 is provided with a readable color different from readable colors determined by the lamp 307, the CCD 310 and a filter (not shown). For example, if the lamp 307 is a green fluorescent lamp of a single wavelength, the index reading unit 330 has a red light source, and an index code is green, an index mark can be recognized by the index reading unit 330 but not read by the CCD 310, and therefore is not stored.

As to the prevention of false storage, a duplicate error of storing the same original twice on the same disk can be prevented in such a manner as to make a comparison between the read index information and the already stored, registered index information, and to issue a warning or stop conveying if the same index exists.

With the above configuration, by further providing a mode of storing no originals, i.e., a mode in which index information is once key-input, and when a first original (only the first page of file) is conveyed, index information as key-input is printed on the original without reading the original, it is possible to store additionally several types of files at once because the index information is simply printed at the first page of file.

Figure 4:
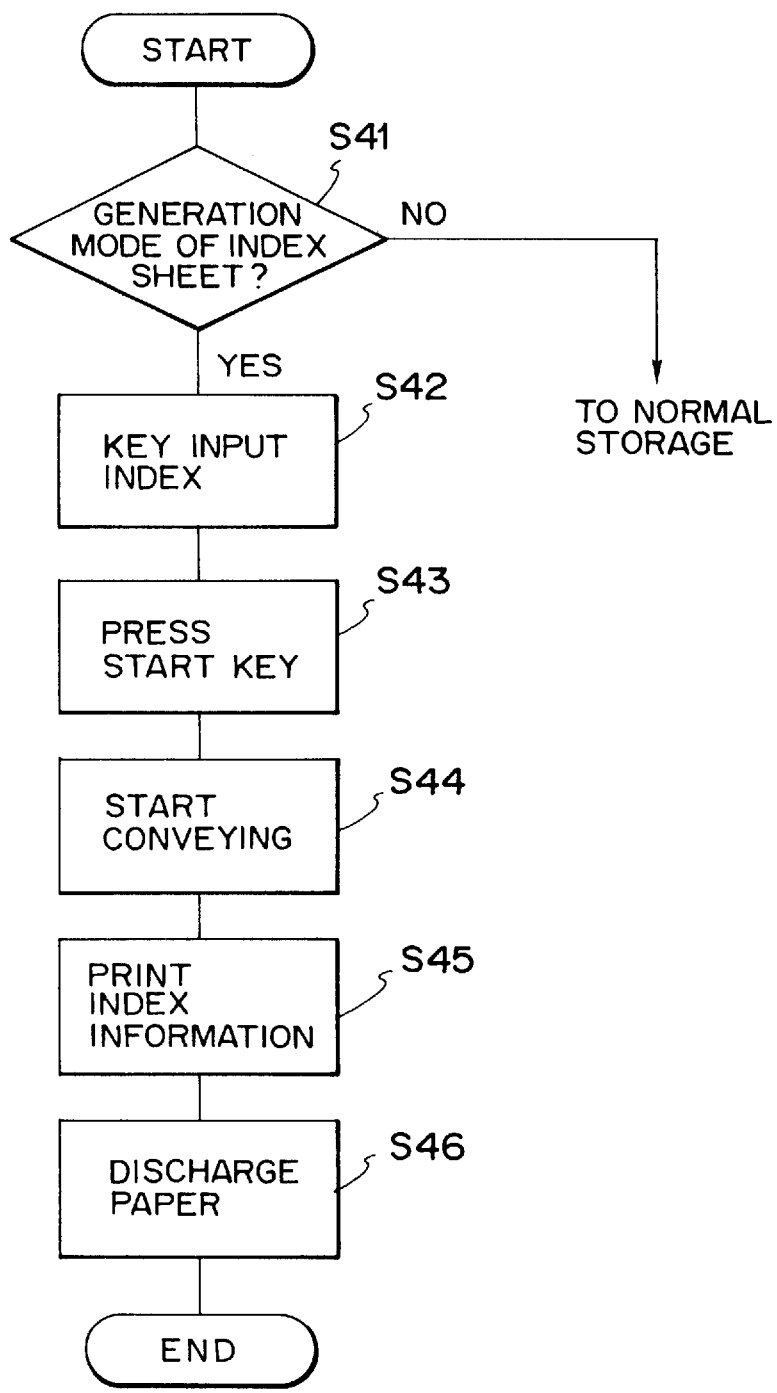
FIG. 4 is a flowchart illustrating the operation of the third embodiment of the invention.
Figure 6:
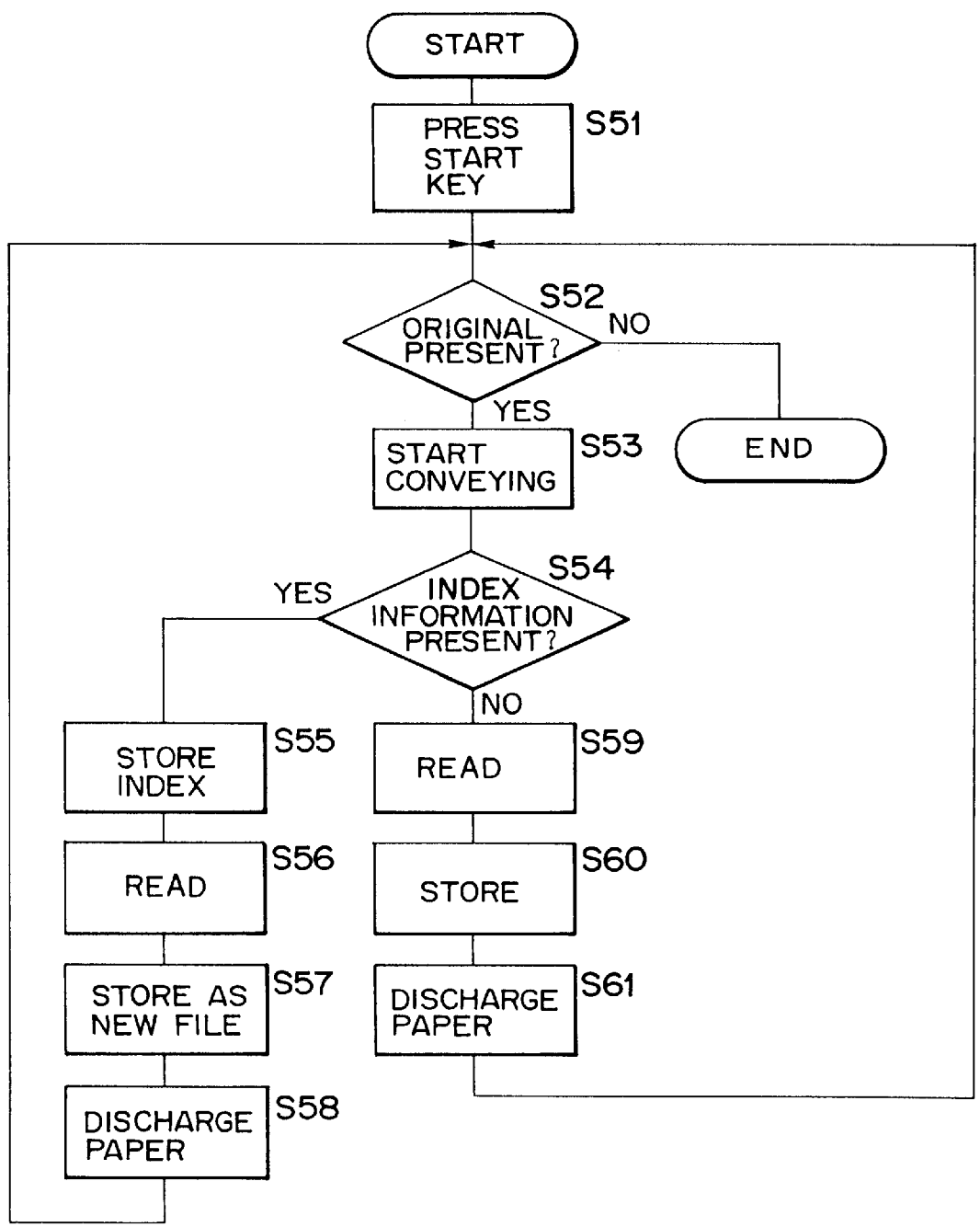
FIG. 6 is a flowchart illustrating the operation of the third embodiment.

FIG. 4 is a flowchart illustrating an operation of printing index information in such a mode of storing no originals (index generation mode), and FIG. 6 is a flowchart illustrating an operation of storing originals having index information printed in the index generation mode.

In FIG. 4, first, the index generation mode is set (S41), and an index is key-input (S42). And if the start key is depressed (S43), the conveyance of originals is started (S44), and the index information previously input is printed on the original (S45). Then the original is discharged, and the operation is ended. Note that when the apparatus is not in the index generation mode, normal storage is performed.

Figure 5:
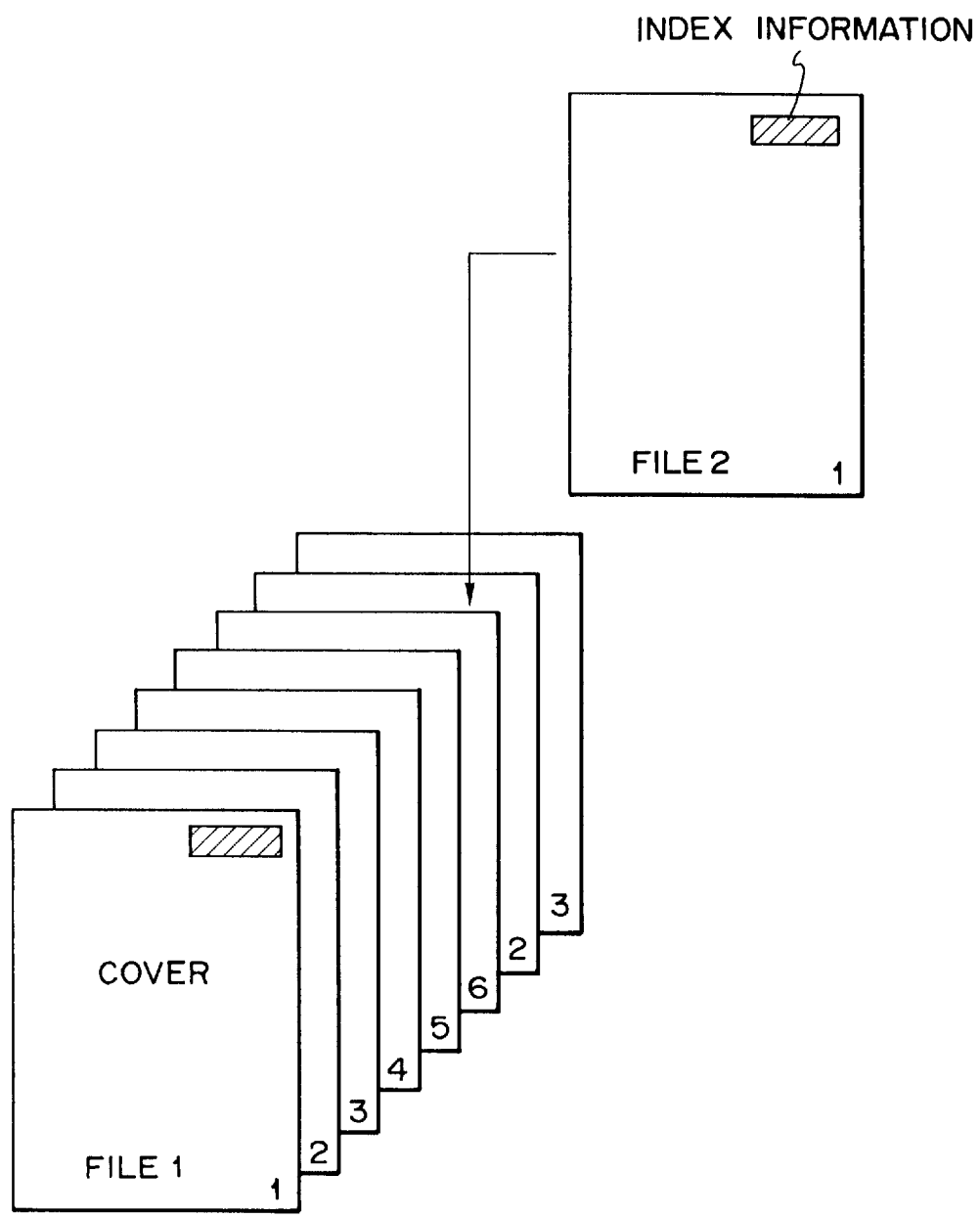
FIG. 5 is a perspective view illustrating originals in the third embodiment.

An index sheet thus generated (having index information printed on the cover of file) is returned to the top of file, and a plurality of files are collectively laid on the original stacker board of a sheet feed portion, as illustrated in FIG. 5, after which if depressing the start key, the operation is executed as illustrated in FIG. 6.

That is, if the start key is depressed (S51), a check is performed to determine whether or not any original is present (S52). If original is sensed (S53), a check is performed to determine in the index information reading unit 330 whether or not any index information is provided in the original (S54). If index information is confirmed, its index is stored (S55), and the original is read (S56) and stored as a new file (S57). Then the original is exhausted therefrom (S58), and the operation transfers to the next original. On the other hand, for originals without the confirmation of the index information at S54, original is read (S59), stored (S60) and discharged (S61), considering that it belongs to the same file as the previous original.

In this way, a plurality of files can be stored continuously in such a manner as to preprint the index information (code) on the cover of file and store the originals after returning the cover to the top of the file.

A fourth embodiment of the present invention will be now described.

Figure 7:
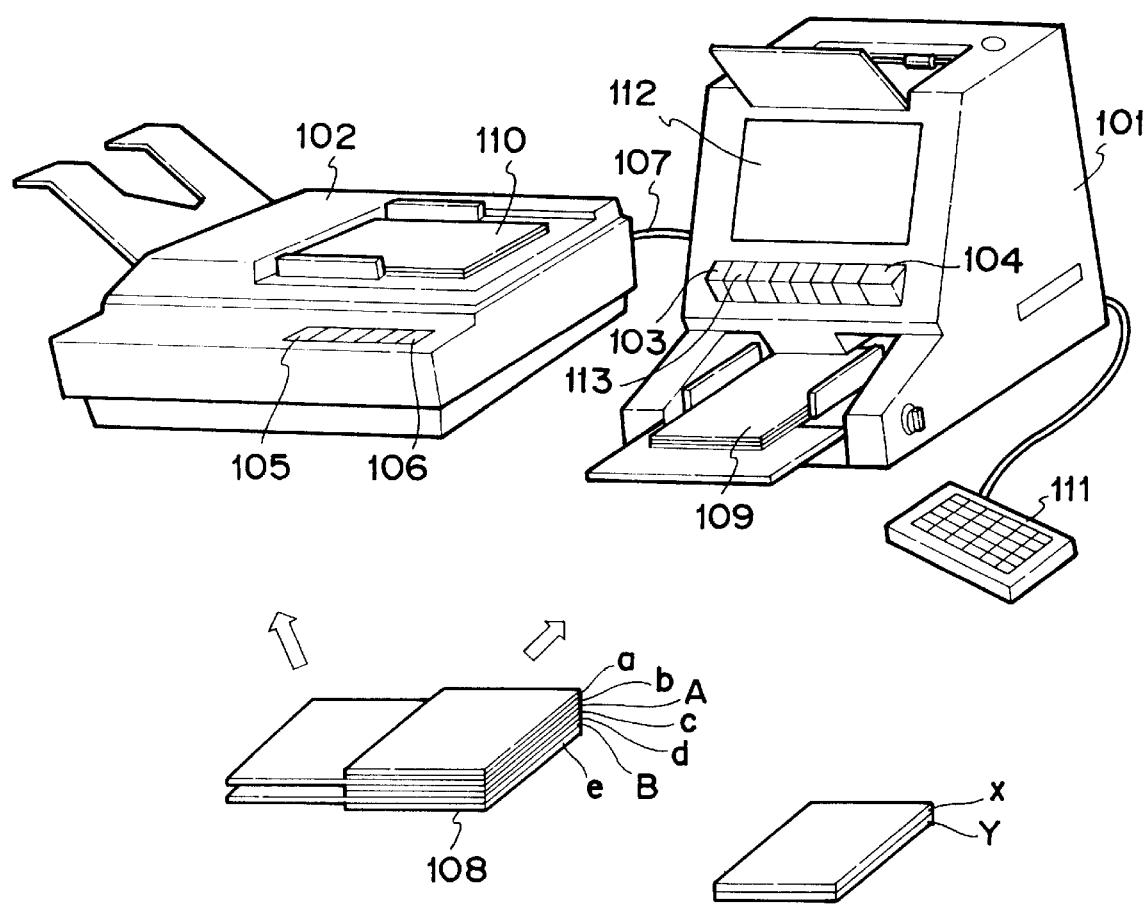
FIG. 7 is a perspective view illustrating the appearance of a system according to the fourth embodiment of the invention.

FIG. 7 is a perspective view exemplifying an image storing apparatus according to the fourth embodiment.

The image storing apparatus 101 is comprised of an image reading unit for reading originals of A4 size at maximum, an image storing unit for storing read image signals into a photomagnetic disk, a retrieving unit for retrieving a stored image, and a display unit for displaying the retrieved image. On the other hand, an image reading dedicated apparatus 102 can read originals A3 at maximum, only comprising an image reading unit to simplify the apparatus, whereby a read image is transferred and stored into the image storing apparatus 101 to allow retrieval and display of the image.

Originals 108 include originals 109 of A4 size as represented by a to e in the figure and originals 110 of A3 size as represented by A and B in the figure.

When these originals are stored by the image storing unit of the image storing apparatus 101, the originals are classified into originals 109 of A4 size and originals 110 of A3 size, which are then set on an original stacker board of each apparatus 101, 102 in the illustrated state.

If an original feed start switch 103 of the image storing apparatus 101 is depressed, original a is fed to the image reading unit where an original image is read and an image signal is stored in the photomagnetic disk. Subsequently, originals b, c, d, e are likewise fed and stored sequentially.

Then, if the original feed start switch 105 of the image reading dedicated apparatus 102 is depressed, original A is fed to the image reading unit, where an image is read, and an image signal is transmitted via a signal line connecting the image storing apparatus 101 and the image reading dedicated apparatus 102 to the image storing apparatus 101, and stored in the photomagnetic disk. Subsequently, original B is likewise fed and its original image is stored.

Figure 8A:
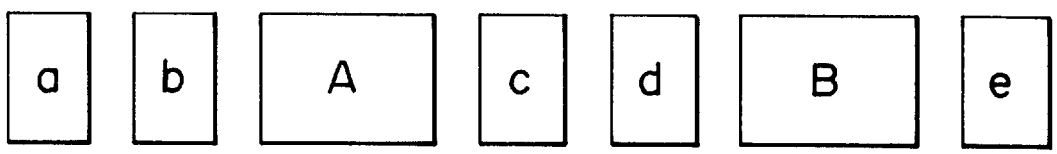
FIGS. 8A to 8C are typical views for explaining the order of originals.
Figure 8B:
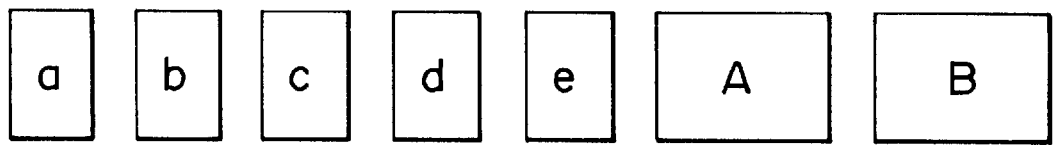

However, if an image stored in this manner is retrieved by the image storing apparatus 101, originals arranged in an order as indicated in FIG. 8A will be retrieved in an order as indicated in FIG. 8B.

Thus, if originals are to be stored in the order of the serial number of originals as provided, the operator must perform the following operation.

First, originals are classified into originals of A4 size and originals of A3 size, whereby originals 109 of A4 size are set on the image storing apparatus 101, and originals 110 of A3 size are set on the image reading dedicated apparatus 102.

And if the original feed start switch 103 of the image storing apparatus 101 is depressed, original a is fed to the image reading unit where an original image is read and an image signal is stored in the photomagnetic disk. Subsequently, original b is likewise fed and stored therein.

And if an original feed end switch 104 is depressed after this original b is fed to the reading unit, the feeding of an original c is stopped.

Then, if the original feed start switch 105 of the image reading dedicated apparatus 102 is depressed, an original A is fed to the image reading unit where an original image is read, and an image signal is transmitted via a signal line connecting the image storing apparatus 101 and the image reading dedicated apparatus 102 to the image storing apparatus 101 and stored in the photomagnetic disk.

On the other hand, if an original feed end switch 106 is depressed after original A is fed to the image reading unit, the feeding of an original B is stopped.

Then, if the original feed start switch 103 of the image storing apparatus 101 is depressed, original c is fed to the image reading unit, where an image signal is stored. Subsequently, original d is likewise fed and stored therein.

Figure 8C:
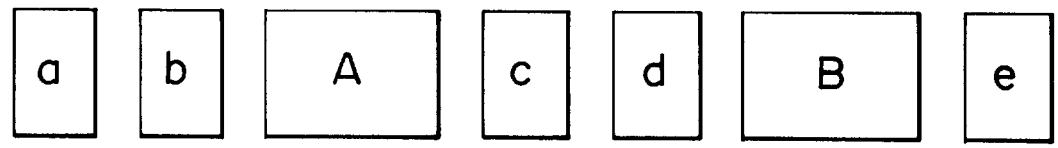

And if the original feed end switch 104 is depressed after original d is fed to the reading unit, the feeding of an original e is stopped. Thereafter, by repeating the above operation, original B and original e are stored in this order. If original images stored in this manner are retrieved, they are retrieved in an order as indicated in FIG. 8C, which is coincident with the given order of originals as indicated in FIG. 8A.

Also, another manner is conceived in which if the original feed start switch 103 is depressed in a state where originals 109 are set on the image storing apparatus 101, and originals 110 are set on the image reading dedicated apparatus 102, the originals a, b, c, d, e are fed to the image reading unit and stored in the photomagnetic disk. In this case, each image is given a serial number such as 1, 2, 3, 4 and 5.

Next, by making a designation from the keyboard 111 connecting to the image storing apparatus 101, an image of serial number 2 stored in the photomagnetic disk, i.e., an image of the original b, can be retrieved. Herein, if an additional storage setting key 113 is depressed, the additional,images can be stored after original b. If the original feed start switch 105 of the image reading dedicated apparatus 102 is depressed in this state, original A can be fed to the reading unit.

And if the original feed end switch 106 is depressed after this original A is fed to the reading unit, the feeding of an original B is stopped. In the reading unit, an image of the original A is read, and an image signal is transmitted to the image storing apparatus 101 and stored in the photomagnetic disk, resulting in the serial number of the original A being equal to three next to the original b. In this case, the serial numbers 3, 4, 5 of the originals c, d, e are automatically changed to 4, 5, 6, respectively, when the original A is inserted at the third position.

Similarly, if an image of original d is retrieved and thereafter an image of the original B is stored, the serial number of the original B image is equal to 6, and that of the original e image is equal to 7, whereby originals can be stored according to the given serial number of originals 108.

Also, another method is conceived in which all originals are read by the image reading dedicated apparatus 102 without classifying originals into those of A4 and A3.

The following embodiment is such that when originals are required to be read by separate apparatuses because of different kinds of originals being mixed, original images are allowed to be stored according to the given order of originals without any complicated operation. That is, when reading several different kinds of originals which are to be allocated to a plurality of reading means, there are provided recognition means for recognizing the reading means used in reading originals and the order of the read originals provided before being allocated to the reading means and control means for controlling the storage of a read image into storing means by attaching the order of the originals provided before being allocated to the read images, based on the information of the recognition means, whereby originals are stored so that they are retrieved according to the serial number as originally provided.

Figure 9:
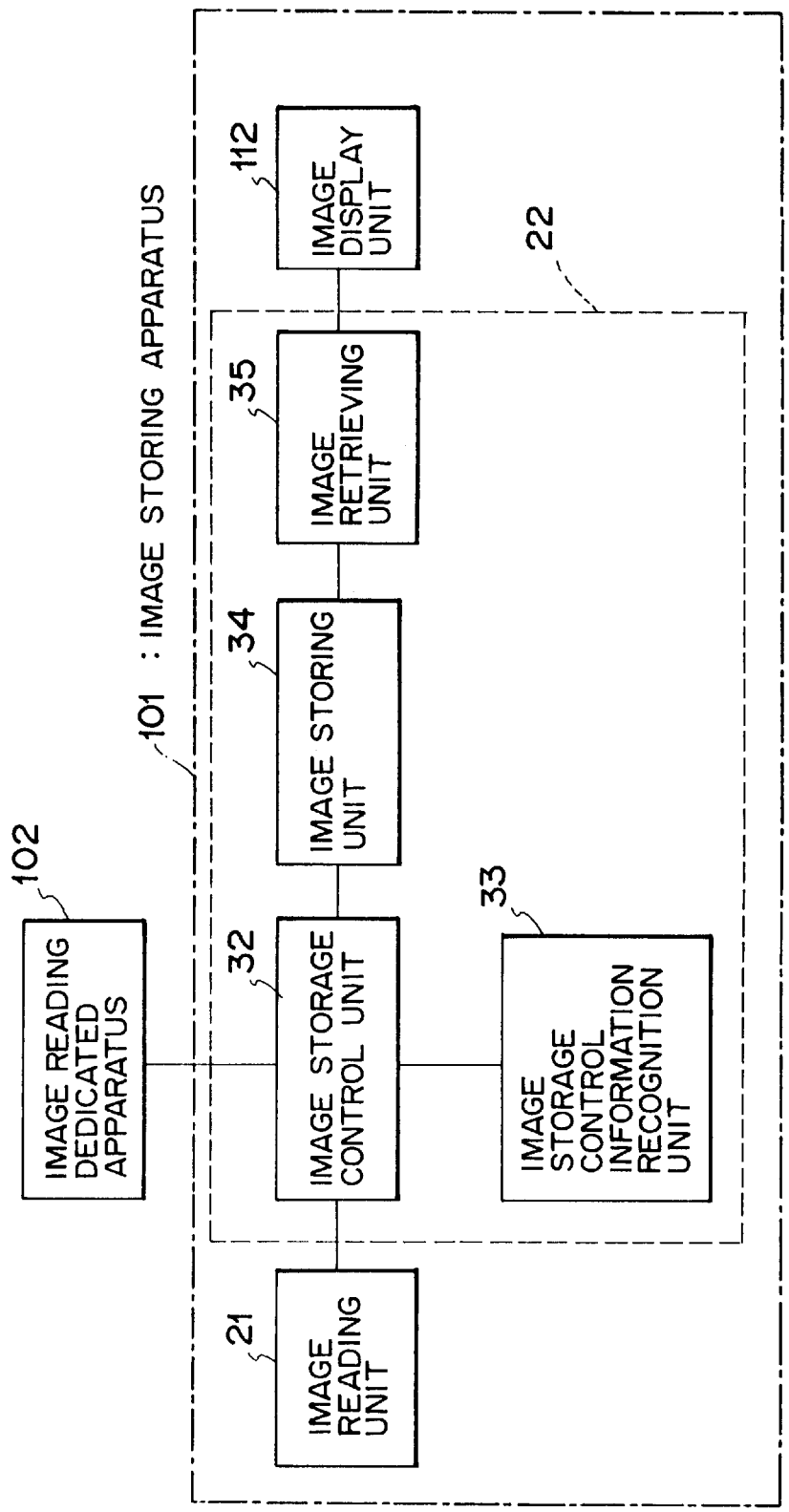
FIG. 9 is a block diagram illustrating a circuit configuration in the fourth embodiment.

The perspective view illustrating a system according to the fourth embodiment of the present invention is identical to that of FIG. 7, and FIG. 9 is a block diagram illustrating the circuit configuration of this embodiment.

In this embodiment, the image storing apparatus 101 is comprised of an image reading unit 21 for reading originals of A4 size at maximum, a recognition unit 33 for recognizing the information controlling the manner of storing an image, a storage control unit 32 for controlling the storage based on the recognized information, an image storing unit 34 for storing the read image into the photomagnetic disk, a retrieving unit 35 for retrieving the stored image, and a display unit 112 for displaying the retrieved image.

On the other hand, an image reading dedicated apparatus 102 has only an image reading unit for reading originals of A3 at maximum, wherein an image read by the image reading dedicated apparatus 102 is stored via a signal line 107 and then retrieved or displayed.

Also, originals 108 include the originals of A4 size as indicated by a to e and the originals of A3 size as indicated by A, B. Also, the originals X, Y are the originals of A4 size involving the order of the originals of A3 size and a recognition mark (see FIG. 11) for assigning the reading to the image reading dedicated apparatus 102. This mark may be preprinted on a seal which the operator will paste on the original, directly printed on the original by a printer, handwritten, or stamped.

Figure 10:
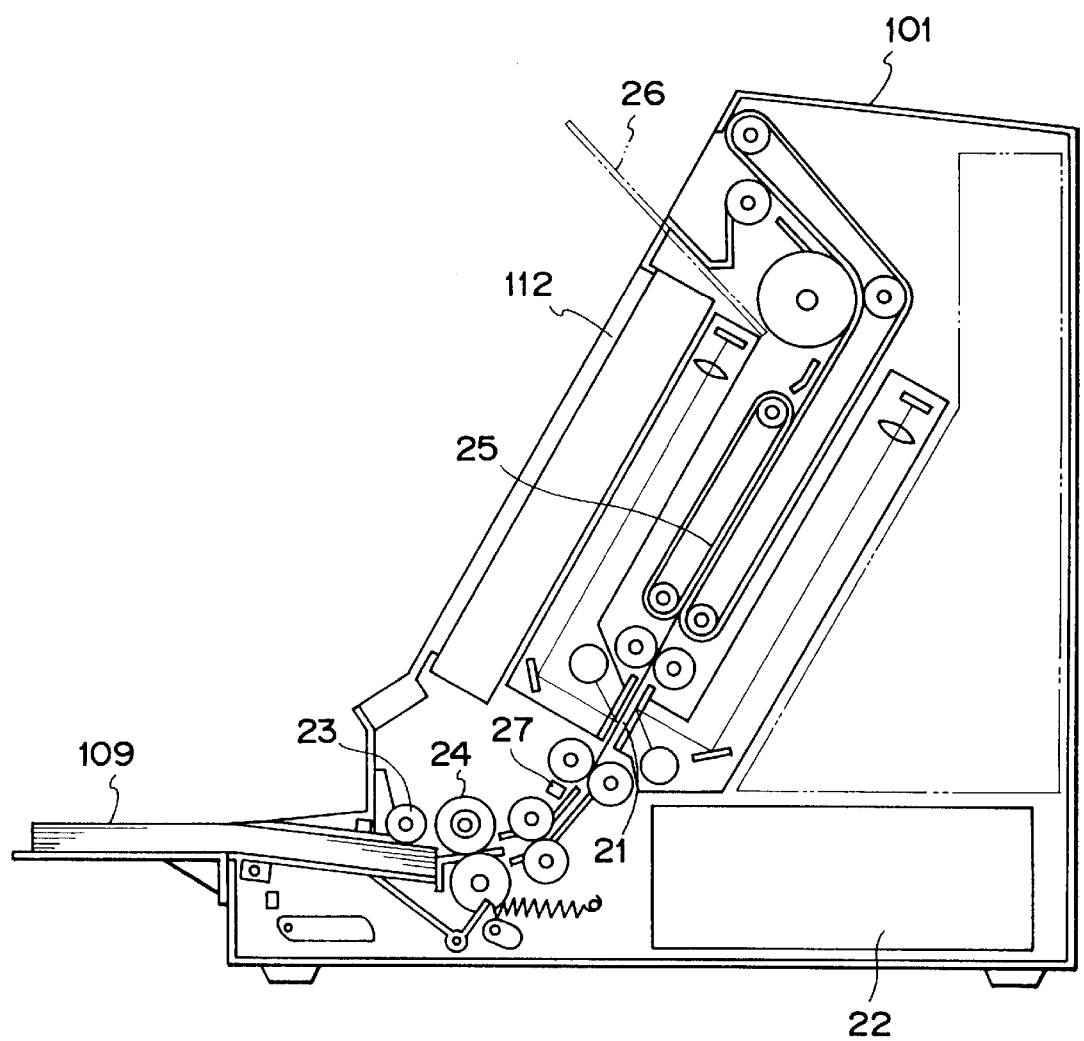
FIG. 10 is a schematic cross-sectional view illustrating an image storing apparatus in the fourth embodiment.

FIG. 10 is a schematic cross-sectional view illustrating the construction of the image storing apparatus 101 as described above. This image storing apparatus 101 is provided with an image reading unit 21, an image storing unit 22, a sheet feed roller 23, conveying rollers 24, conveying belts 25, a sheet exhaust portion 26 and a mark reading sensor 27. Originals 109 are fed by the sheet feed roller 23, each one original is passed via the conveying rollers 24 to the image reading unit 21, and a read image is stored in the photomagnetic disk by the image storing unit 22. Also, originals 109 are sequentially conveyed between the conveying belts 25 and discharged in succession into the sheet exhaust portion 26.

Figure 11:
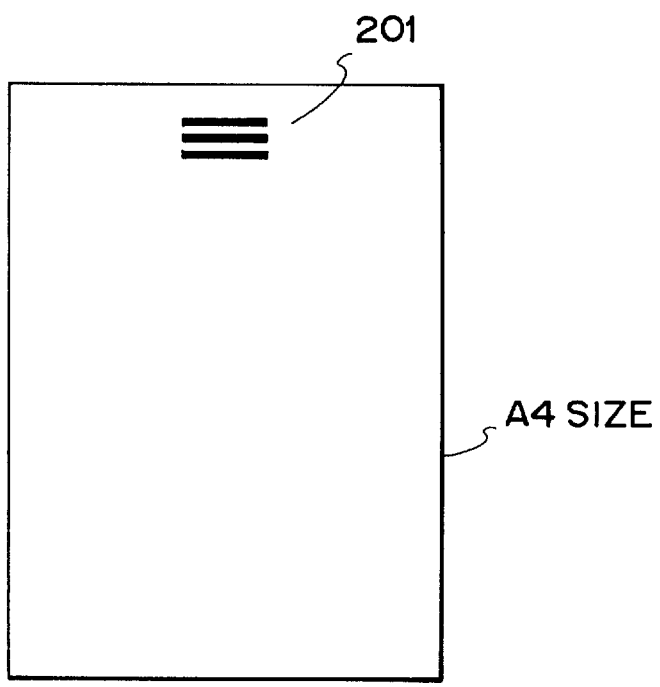
FIG. 11 is a plan view illustrating original provided with a recognition mark as storage control information in the fourth embodiment.

Herein, if originals having a recognition mark 201 provided as the storage control information are fed as illustrated in FIG. 11, they are read by the mark reading sensor 27.

The recognition mark 201 is a bar code mark in an instance of FIG. 11, but not limited thereto, and other marks may be utilized that can be recognized by the mark reading sensor 27.

An image stored in the photomagnetic disk by the image storing unit 22 can be retrieved upon a retrieval designation from the keyboard 111 of the image storing apparatus 101, and displayed on a display screen 112.

Next, an operation procedure of reading and storing the originals 108 will be described below.

Figure 12:
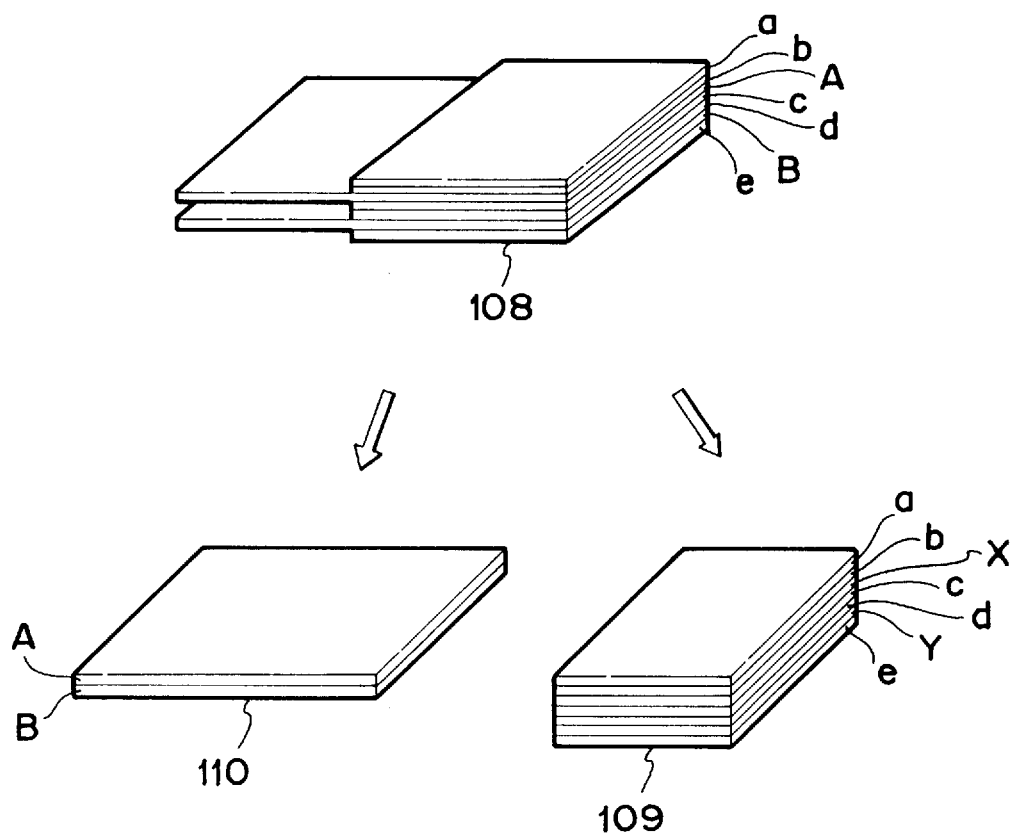
FIG. 12 is a perspective view illustrating the state of classifying originals in the fourth embodiment.

The operator picks up only originals A, B of A3 size from among the originals of both A4 size and A3 size which are mixed, and in their place inserts originals X, Y of A4 size for use with recognition of storage control information as illustrated in FIG. 12. Then, originals 109 of A4 size are set on the image storing apparatus 101 and originals 110 of A3 size are set on the image reading dedicated apparatus 102.

Then, if the original feed start switch 103 of the image storing apparatus 101 is depressed, the image storing apparatus 101 starts the feeding of originals, so that original a is fed. Since the original a has no recognition mark 201, an image is read by the image reading unit 21, so that an image signal is stored in the photomagnetic disk by the image storing unit 34.

The original b is likewise fed to the image reading unit 21, where an image is read and an image signal is stored therein. Then, if the original X is fed, a recognition mark 201 provided on the original X is read by the mark reading sensor 27 of the image recognition unit 33. If the mark 201 is read, an original image corresponding to the original X is recognized to be read by the image reading dedicated apparatus 102, recognized information and the serial number corresponding to the original X are stored in the image storage control unit 32, and the original X is exhausted therefrom without being read.

Thereafter, the originals c, d, Y, e are likewise processed, and especially the original Y is processed just like the original X.

In this way, the storing of the originals a, b, . . . , e set on the image storing apparatus 101 is ended, at which time the image storage control unit 32 stores such information that two originals corresponding to the originals X, Y are to be read by the image reading dedicated apparatus 2 as well as the serial numbers of those originals.

Subsequently, the image reading dedicated apparatus 102 starts the feeding of originals, so that the original A is fed to the image reading unit, a read image is transmitted through the signal line 107 to the image storage control unit 32 of the image storing apparatus 101, and an image signal is stored by the image storing unit 34.

In this case, the serial number of original A is stored as the location of the original X, i.e., after the original b. Similarly, the serial number of the original B is stored as the location of the original Y.

Figure 13A:
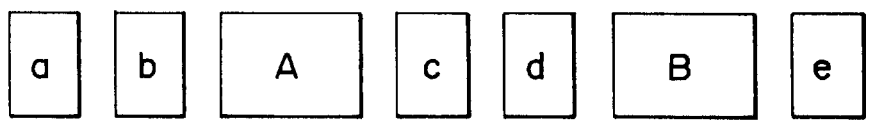
FIGS. 13A to 13C are typical views for explaining the order of originals in the fourth embodiment.
Figure 13B:
Figure 13C:
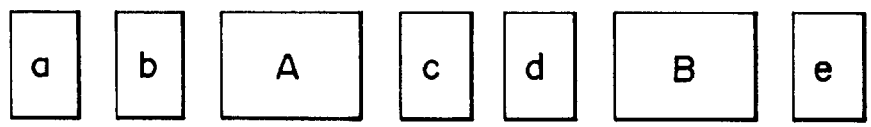

Accordingly, when all originals have been stored, the images corresponding to the serial numbers 1, 2, 3, 4, 5, 6 and 7 are arranged in the originally given order of the originals a, b, A, c, d, B, e. That is, by reading and storing images in an order as indicated in FIG. 13B for the originals arranged in an order as indicated in FIG. 13A, the images can be retrieved in an order as indicated in FIG. 13C.

While there was described a method in which the originals of different sizes are read by classifying them, it should be noted that this method may be also effective when reading apparatuses must be changed to store different kinds of images by classifying the originals in accordance with the settings, such as when it is required that reading means has the settings of the reading mode changed depending on the original, because color originals, photographs, or blueprinted originals are mixed with black and white originals.

Next, a system according to the fifth embodiment of the present invention will be described with reference to FIG. 7. This fifth embodiment has a basic construction of the apparatus common to that of the fourth embodiment, but is different in respect of the control method when reading and storing the originals of different sizes which are mixed.

First, originals 108 stored in the fifth embodiment consist of the originals of A4 size and A3 size which are mixed, wherein originals a to e are of A4 size and the originals A, B are of A3 size. And the originals A, B are placed at the third and sixth locations from the above, respectively.

In this case, the operator sets originals of A4 size on the image storing apparatus 101 and originals of A3 size on the image reading dedicated apparatus 102. Further, the operator inputs the orders of originals of A3 size, i.e., 3 and 6, sequentially via the keyboard 111 connected to the image storing apparatus 101, and causes the image storage control unit 32 to store them. These numerical values indicate that the third and sixth images are read from the image reading dedicated apparatus 102.

If the original feed start switch 103 of the image storing apparatus 101 is depressed, the originals a to e are read and stored. In this case, the images are stored in the order of the serial number of image 1, 2, 4, 5, 7 by skipping 3 and 6. Subsequently, originals A and B are read and stored by the image reading dedicated apparatus 102. In this case, original A is stored at a location of the serial number of 3 and original B is stored at a location of the serial number of 6, corresponding to the designated order from the keyboard 111.

Accordingly, the images corresponding to the serial number of 1, 2, 3, 4, 5, 6, 7 are a, b, A, c, d, B, e which is coincident with the given order of originals.

A sixth embodiment of the present invention will be now described.

While in the fourth embodiment all originals with the image storing apparatus 101 are stored and thereafter the originals with the image reading dedicated apparatus 102 are stored, it will be appreciated that the reading order of the image storing apparatus 101 and the image reading dedicated apparatus 102 may be changed in accordance with the serial number.

The operator picks up the originals A, B of A3 size from the originals consisting of the originals of A4 size and A3 size which are mixed and instead inserts the originals X, Y of A4 size for recognition of switching of a reading apparatus, as illustrated in FIG. 12. Then, the operator sets originals 109 of A4 size on the image storing apparatus 101 and originals 110 of A3 size on the image reading dedicated apparatus 102.

Thereafter, if the original feed start switch 103 of the image storing apparatus 101 is depressed, the image storing apparatus 101 starts the feeding of originals, so that an original a is first fed.

The original a, having no recognition mark, is read by the image reading unit 21, and an image signal is stored in the photomagnetic disk by the image storing unit 34. Original b is likewise fed to the image reading unit 21, where an image is read and an image signal is stored.

Then, if the original X is fed, the recognition mark is read, and the original is exhausted therefrom without image being read. Subsequently, an apparatus recognized by the recognition mark, i.e., image reading dedicated apparatus in this embodiment, starts the feeding of originals, so that the original A is read by the image reading unit, and a read image is transmitted via the signal line 107 to the image storing apparatus 101 where an image signal is stored.

If the storing of the original A is ended, the image storing apparatus starts the feeding of originals again, whereby images of originals c, d are read and stored in sequence by the image storing apparatus 101, and then in place of original X, an image of original B is read and stored by the image reading dedicated apparatus 102.

In this manner, if the image signals of all originals are stored, the reading and storing operation is ended. In this case, the serial number of stored image accords with the given serial number of original.

Figure 14:
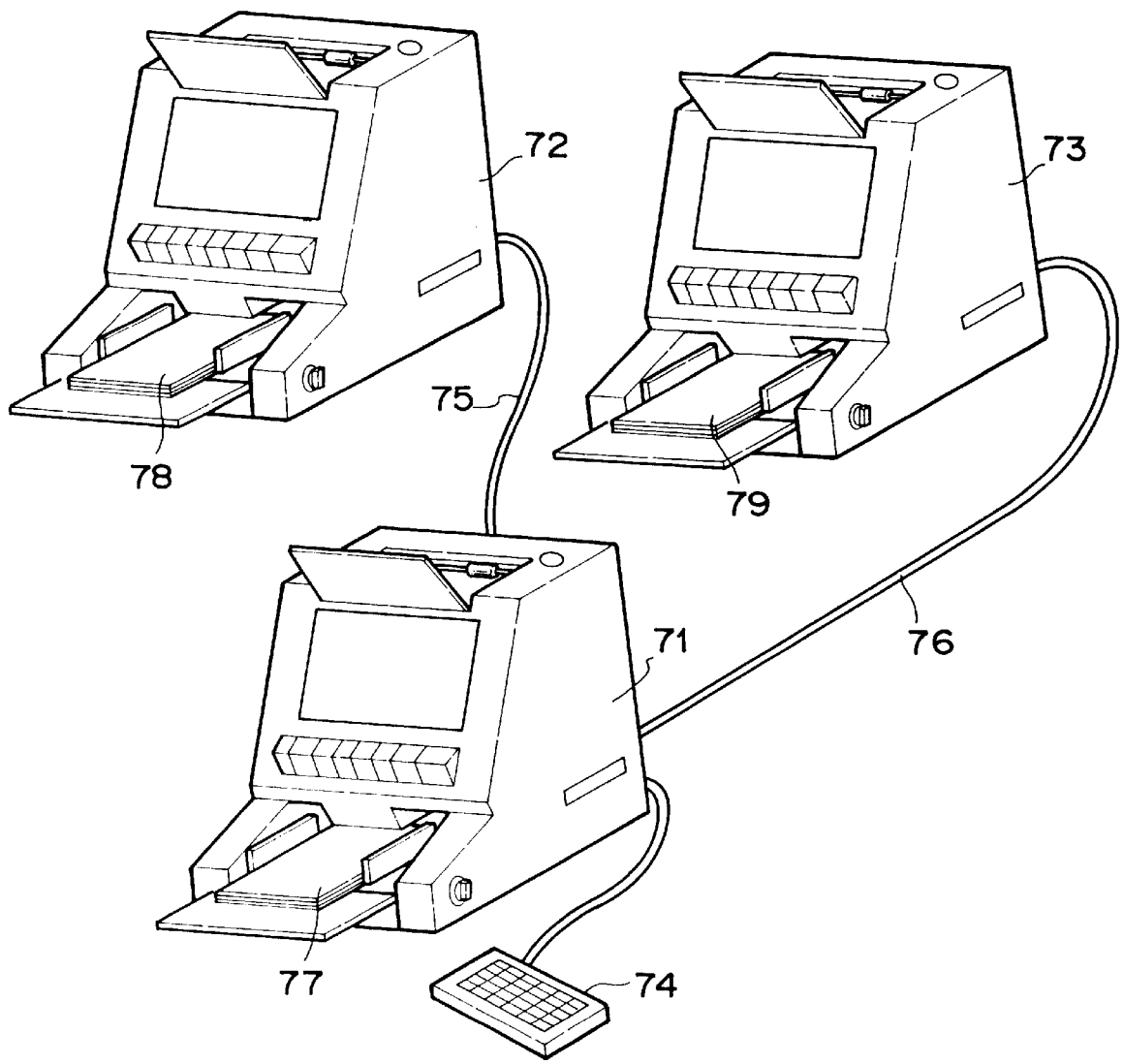
FIG. 14 is a perspective view illustrating the appearance of a system according to the sixth embodiment of the invention.
Figure 15:
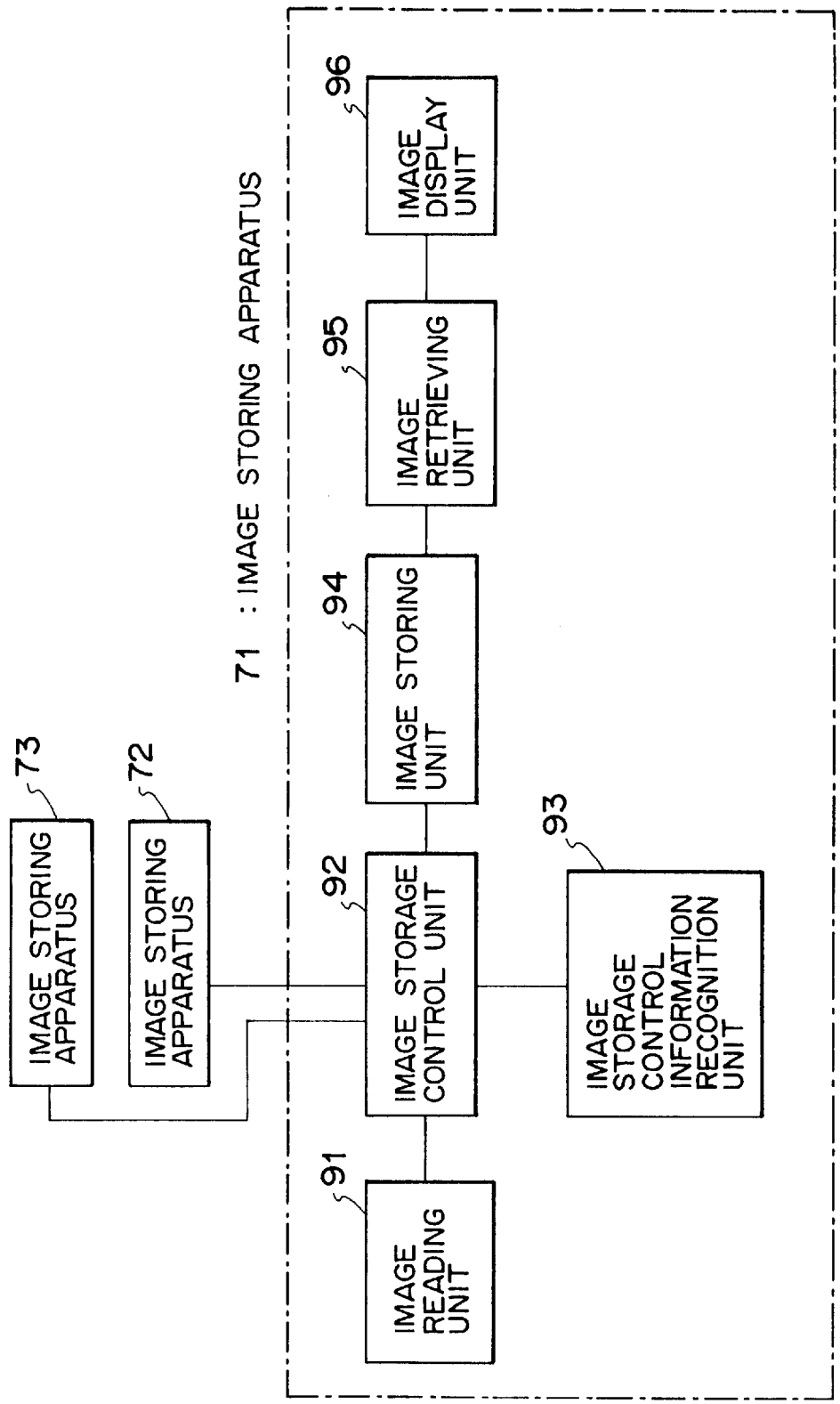
FIG. 15 is a block diagram illustrating a circuit configuration in the seventh embodiment.

A seventh embodiment of the present invention will be now described. FIG. 14 is a perspective view illustrating the appearance of a system in the seventh embodiment, and FIG. 15 is a block diagram illustrating a circuit configuration in the seventh embodiment.

The above described embodiments involve two reading apparatuses of the image storing apparatus 101 and the image reading dedicated apparatus 102, whereas the seventh embodiment will be described with an instance where originals A, B as illustrated in FIG. 17 are stored using three image storing apparatuses 71, 72, 73 as illustrated in FIG. 14.

Figure 16:
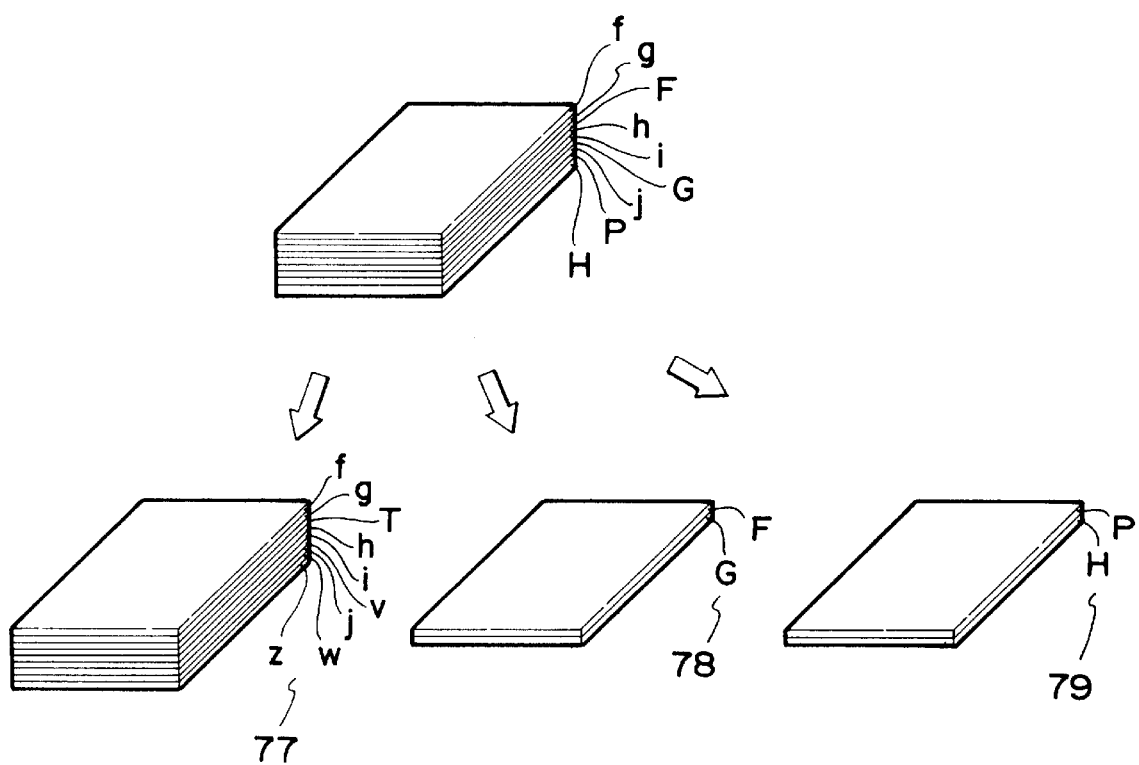
FIG. 16 is a perspective view illustrating the state of classifying originals in the seventh embodiment.

In FIG. 16, originals f to j are black and white character originals, and originals F, G are blueprinted originals of low density. Also, originals P, H are photographs, and originals T to Z have a recognition mark attached thereto. These originals are all of A4 size.

Figure 17A:
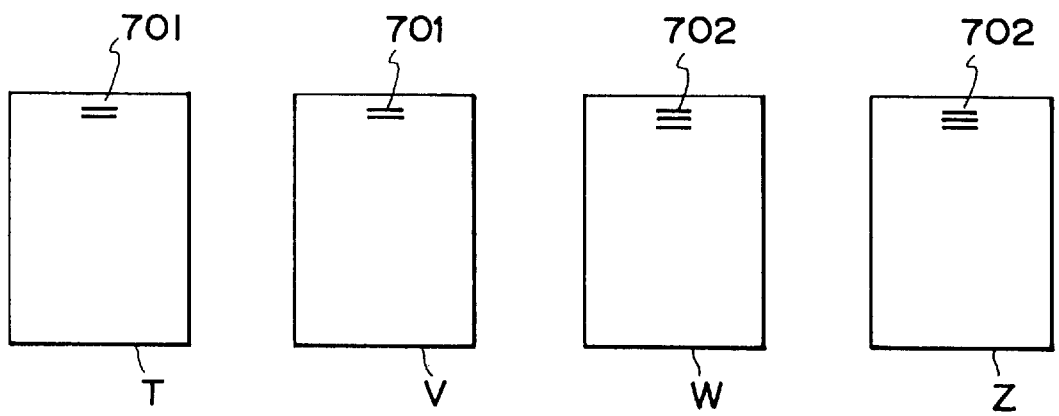
FIGS. 17A and 17B are plan views illustrating originals provided with a recognition mark as storage control information in the seventh embodiment.
Figure 17B:
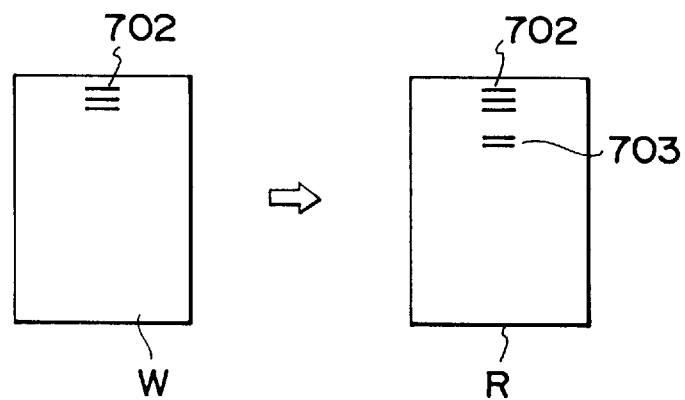

FIGS. 17A and 17B are typical views illustrating examples of a recognition mark in the seventh embodiment.

In FIG. 17A, reference numeral 701 represents a recognition mark indicating that originals corresponding to originals T, V are read by an image storing apparatus 72, and reference numeral 702 represents a recognition mark indicating that originals corresponding to originals W, Z are read by an image storing apparatus 73.

In FIG. 14, image storing apparatus 71 is set to a normal original reading mode, image storing apparatus 72 is set to a low density original reading mode, and image storing apparatus 72 is set to a photograph reading mode.

The operator picks up blueprinted originals F, G and photographic originals P, H, as illustrated in FIG. 16, and instead inserts the originals T to Z for a recognition of the image storing apparatus.

Then, the originals f, g, . . . (originals 77) are set on the image storing apparatus 71, the originals F, G (originals 78) are set on the image storing apparatus 72, and the originals P, H (originals 79) are set on the image storing apparatus 73, as illustrated in FIG. 14.

And if the original feed start switch of the image storing apparatus 71 is depressed, the feeding of the originals is started, whereby original f is fed and read by the image reading unit 91, and an image signal is stored in the photomagnetic disk by the image storing unit 94. The original g is similarly stored therein. If the original T is fed, an information recognition mark 701 is read by an image recognition unit 93, and the fact that the original corresponding to the original T is read by the image storing unit 72, as well as the serial number of original corresponding to the original T, are stored, after which the original is exhausted therefrom without reading any image of the original T. Subsequently, the originals h, i, V, j are likewise read.

Also, if the original W is fed, an information recognition mark 702 is read by the image recognition unit 93, and the fact that the original corresponding to the original W is read by the image storing apparatus 73, as well as the serial number of original corresponding to the original W, are stored, and the original is exhausted therefrom without reading any image of the original W. The original Z is likewise processed.

In this manner, the storing of original 77 set in the image storing apparatus 71 is ended, at which time the image storage control unit 92 stores the fact that two originals corresponding to the originals T, V are read by the image storing apparatus 72 and the serial numbers of those originals, as well as the fact that two originals corresponding to the originals W, Z are read by the image storing apparatus 73 and the serial numbers of those originals.

Subsequently, the image storing apparatus 72 starts the feeding of originals, so that the original F is fed to the image reading unit where an image is read. A read image signal is transmitted via the signal line 75 to the image storage control unit 92 of the image storing apparatus 71, and stored in the image storing unit 94. In this case, the original F is given a serial number of the original T, and is stored after the original g.

Subsequently, the original G is fed to the image reading unit, and likewise is given a serial number of the original V and is stored therein.

In this manner, if the storing of the originals by the image storing apparatus 72 is ended, the image storing apparatus 73 starts the feeding of the originals, so that the originals P is fed to the image reading unit, where an image is read. A read image signal is transmitted via the signal line 76 to the image storage control unit 92 of the image storing apparatus 71, and stored in the image storing unit 94. In this case, the original P is given a serial number of the original W, and stored therein.

Then, the original H is fed to the image reading unit, and likewise is given a serial number of the original Z and stored therein.

Accordingly, when all originals are stored, the images corresponding to the serial numbers of 1, 2, 3, 4, 5, 6 and 7, are f, g, F, h, i, G, j, P, H which is coincident with the given order of the originals. Of course, the same procedure can be applied when four or more image storing apparatuses are provided.

While in the above embodiment, when two originals succeeding are to be read by the same image storing apparatus, such as the originals P, H, two originals having the same recognition mark 702 attached are fed such as the originals W, Z illustrated in FIG. 17A, it will be appreciated that the original R having a recognition mark 703 indicating that the two originals having a recognition mark 702 attached thereto succeed may be used instead of the originals W and Z, as illustrated in FIG. 17B.

Figure 18:
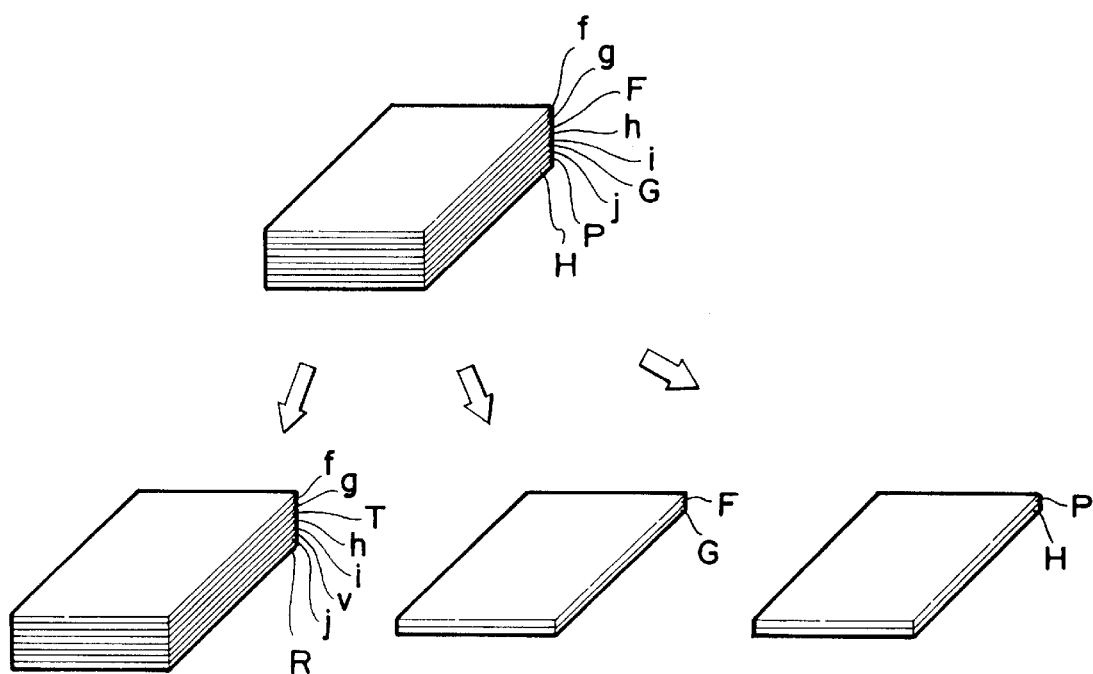
FIG. 18 is a perspective view illustrating the state of classifying originals in the eighth embodiment.

In this way, the number of originals to be fed by the image storing apparatus 71 can be reduced, as illustrated in FIG. 18. Of course, when three or more originals succeed to be read by the same image storing apparatus, the same procedure can be also applied by making the information recognition mark 703 a mark indicating the number of originals.

As described above, when an image storage device having replaceable storing medium is used, an index input before storing originals is printed on the originals by printing means provided on the conveying passageway of originals, so that a confirmation of already stored original can be made at a glance, whereby a duplicate error of storing duplicately the same original on the same disk can be prevented. This can be further secured by issuing a warning on the display or stopping the conveyance.

Also, when one user's disk is used to store originals by another user, index information can be easily input without any key-input operation by reading index information printed on the originals and storing it as an index.

Further, by providing a readable color for index information reading means different from the readable colors for image reading means, an index image can be realized which can be read as the index but not stored as the image.

Also, by preparing a file cover having an index code printed thereon, it is possible to store a plurality of files in succession.

Also, by providing a function of recognizing the serial number of original read by any one of a plurality of reading units and storing the original in accordance with the given order as first provided, the storing of originals can be made in accordance with the given order of originals without any complicated operation even if there are mixed originals of different types.

Figure 19:
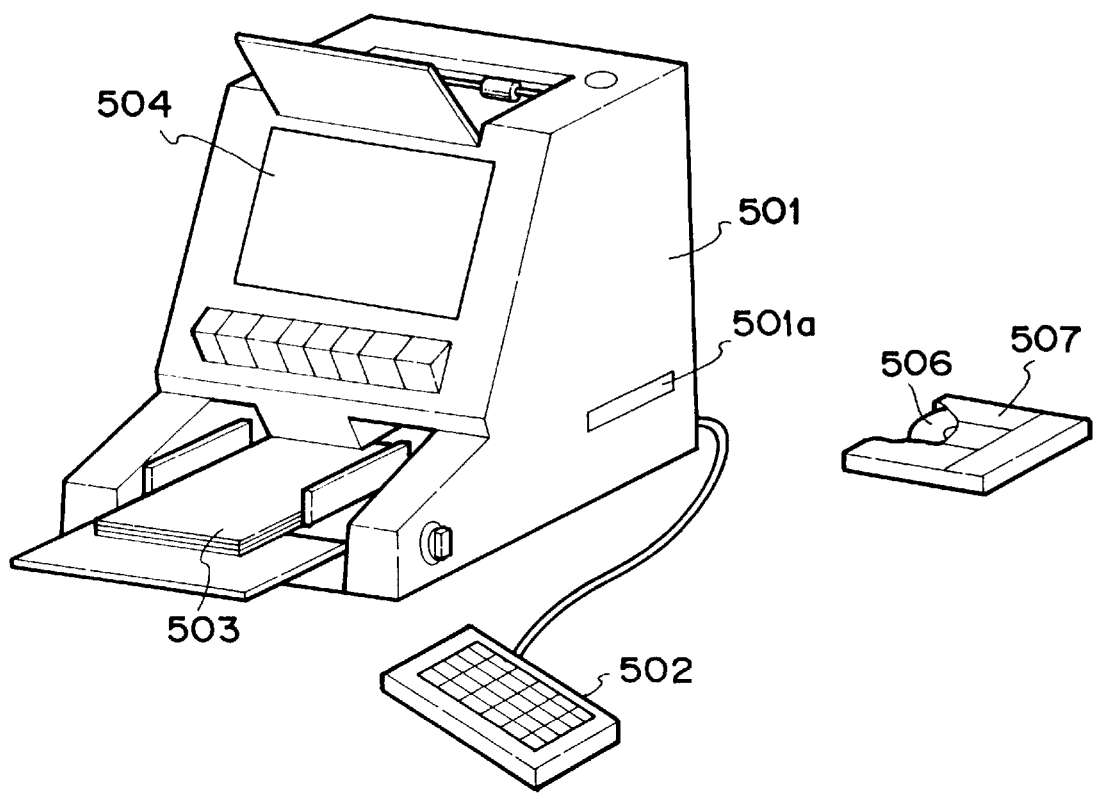
FIG. 19 is a perspective view illustrating the appearance of an image storing apparatus according to the ninth embodiment of the invention.
Figure 20:
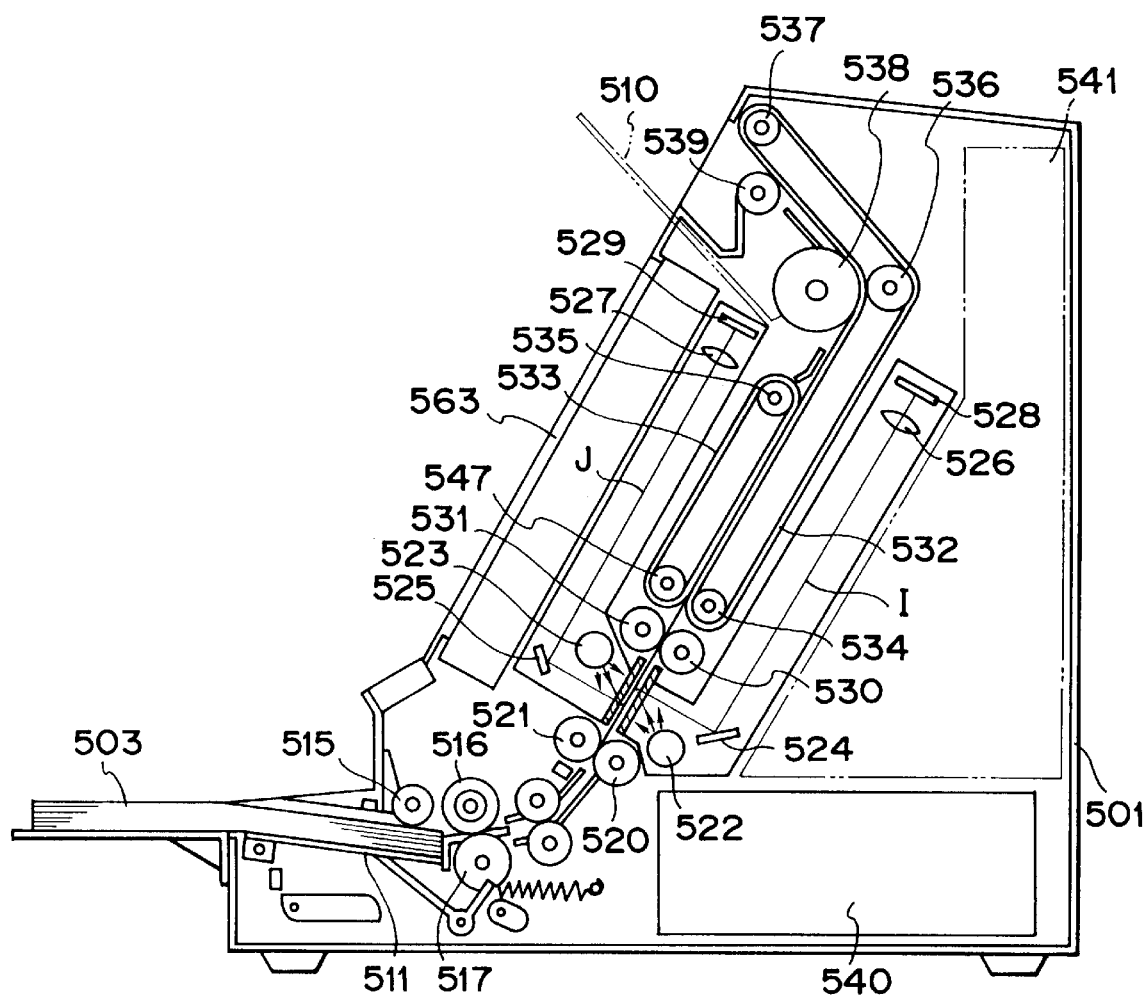
FIG. 20 is a cross-sectional view illustrating the internal construction of the image storing apparatus in the ninth embodiment.

FIG. 19 is a perspective view illustrating the appearance of an image file apparatus according to the eighth embodiment of the present invention, and FIG. 20 is a cross-sectional view illustrating its internal construction.

In FIG. 19, the image file apparatus comprises an apparatus main body 501, an operation board 502, a display 504 and a protection case 507, with sheet-like originals 503 for recording thereon being set in front of the apparatus main body, and there is a photomagnetic disk 506 for recording images of originals 503 which is accommodated within the protection case 507. Also, the operation board 502 is used to enter retrieval information for retrieving a recorded image and various signals for activating the apparatus.

In FIG. 20, originals 503 laid on an original stacker board 511 are fed one sheet each time into the apparatus by virtue of separation means comprising a sheet feed roller 515, a feed roller 516 and a reverse rotation roller 517. And original 503 thus fed is carried between conveying rollers 520, 521 and 530, 531 and conveyed at a constant speed.

Hereby, the original 503 is illuminated by illumination lamps 522, 523 such as fluorescent lamps. And an image on the surface of the original 503 illuminated by an illumination lamp 523 is formed via a plane mirror 525 and an image forming lens 527 on an image sensor 529 such as a CCD, and converted into electrical signal to be read. On the other hand, an image on the back surface of the original 503 illuminated by an illumination lamp 522 is formed via a plane mirror 524 and an image forming lens 526 on an image sensor 528 such as a CCD, and likewise converted into an electrical signal to be read.

The original 503 thus read is carried and fed between conveying belts 532, 533 and exhausted on a sheet exhaust tray 510 by a sheet exhaust roller 539 and a conveying belt 532.

Note that the rollers 534, 536, 537 and 547 are support rollers for the supporting belts 532, 533, and the rollers 535, 538 are drive rollers for the driving belts 532, 533.

A photomagnetic recorder 540 is a unit for recording an image on the photomagnetic disk 506 and reading the recorded image, and an electrical unit 541 is a unit for supplying electric power to the apparatus and having a substrate for electrical control.

The operation of the eighth embodiment will be described below.

Figure 21:
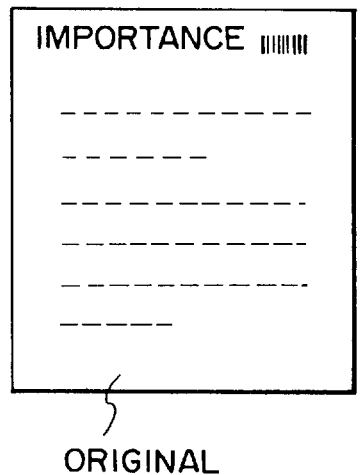
FIG. 21 is a typical view illustrating an example of original in the ninth embodiment.

First, it is noted that important originals to be read into the apparatus are given recognition characters indicating the important document (these characters may be omitted), as well as code information such as a bar code based on a predetermined rule, as illustrated in FIG. 21.

Figure 22:
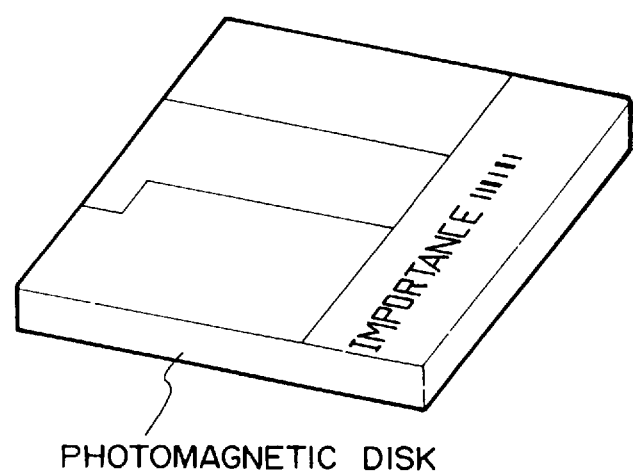
FIG. 22 is a typical view illustrating an example of a photomagnetic disk case in the ninth embodiment.

On the other hand, the protection case 507 for the photomagnetic disk 506 of recording medium is provided with recognition characters indicating that the important document as mentioned above can be recorded (these characters may be omitted), as well as code information such as a bar code corresponding to code information attached to the originals, as illustrated in FIG. 22. However, for the disks to prevent recording of original images thereon, such code information is not provided. The code information such as a bar code provided on the protection cover 507 for the photomagnetic disk 506 is read at the same time when the disk is inserted therein by means of a bar code reading sensor (not shown) provided in the vicinity of a disk insertion opening 510a of the image file apparatus.

Herein, it is supposed that the image file apparatus has currently a disk without code information inserted therein. When originals to be read into the image file apparatus have no code information indicating the important document attached thereto, read original images are recorded sequentially on the disk. However, when originals have code information indicating important document attached thereto, original images are not recorded on the disk because of lack of code information corresponding to the disk.

Next, when the disk inserted into the image file apparatus has code information indicating the important document attached thereon, original images are recorded on the disk as previously described, unless originals read into the image file apparatus have code information indicating the important document attached. However, when originals have code information attached thereto, the code information is read at the same time when the image is read, the read image is recorded if that read image is judged to be recordable into the disk in accordance with a predetermined rule of comparing and collating read code information with code information read from the disk. However, if not, the read image is not recorded.

Figure 23:
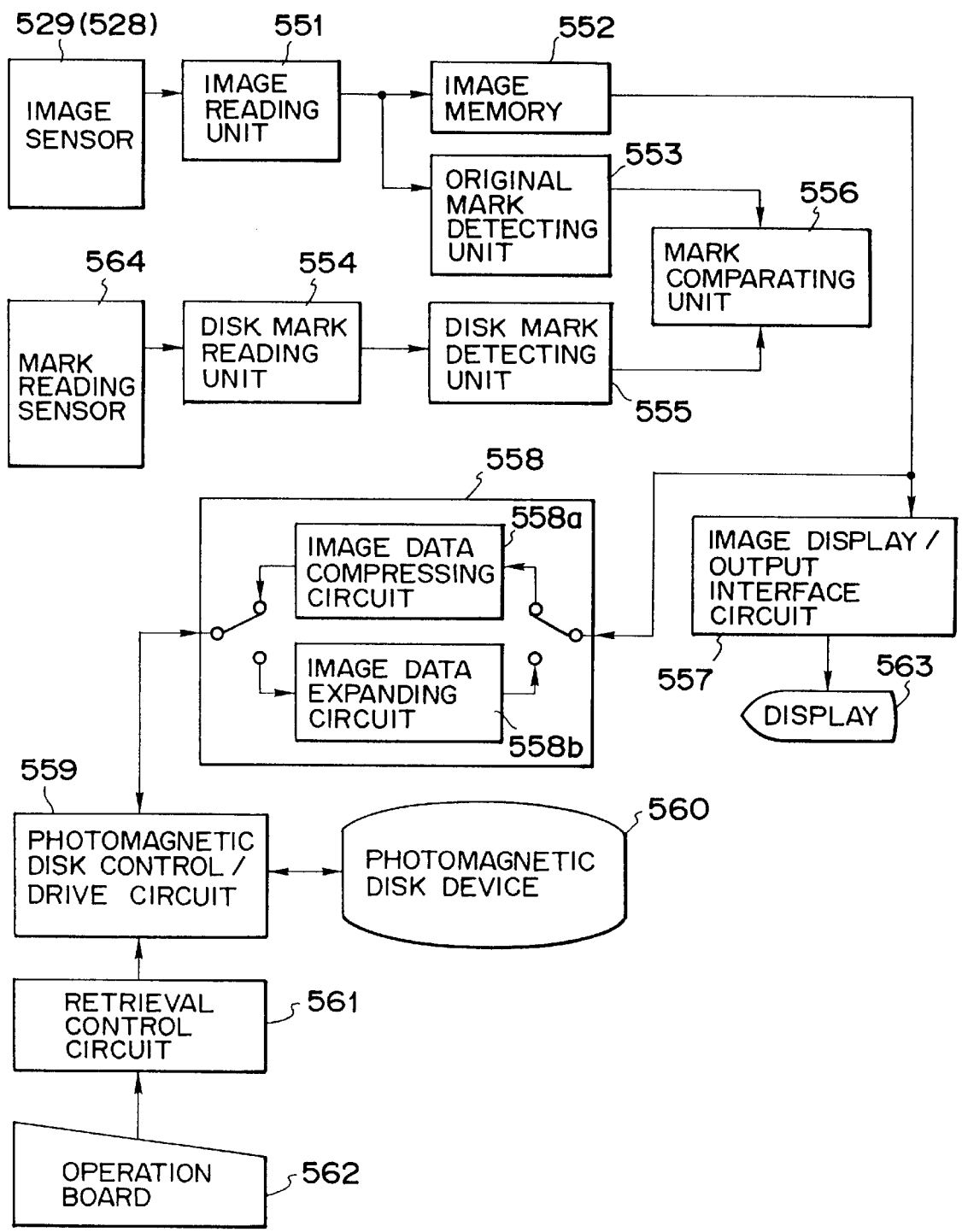
FIG. 23 is a block diagram illustrating the configuration of the image storing apparatus in the ninth embodiment.

FIG. 23 is a block diagram illustrating the configuration of the image file apparatus as described above.

In FIG. 23, an image signal read into the image sensors 529 (528) is digitized in the image reading unit 551 and transmitted as image data to an image memory 552 and an original mark detecting unit 553. When the original image has code information such as a bar code indicating the important document attached thereto, the code information is detected by the original mark detecting unit 553.

On the other hand, if the photomagnetic disk inserted into the image reading apparatus has code information attached thereto, the disk code information is read by a mark reading sensor 564, when inserted into the disk unit, and dealt with as code information in a disk mark reading unit 554. And necessary code information is detected in a disk mark detecting unit 555.

The original code information detected by the original mark detecting unit 553 and the disk code information detected by the disk mark detecting unit 555 are compared and collated in a mark comparator 556.

And when the original code information and the disk code information are matched in the mark comparator 556, or when no original code information is detected by the original mark detecting unit 553, the image data stored in the image memory 552 is transmitted to an image display/output interface circuit 557 and an image data compression circuit 558a of an image data compression/expansion circuit 558. And the image data transmitted to the image display/output interface circuit 557 is transmitted and displayed on a display 563. That is, the read original image is displayed substantially in real time. On the other hand, the image data transmitted to the image data compression circuit 558a of the image data compression/expansion circuit 558 is compressed, transmitted to a photomagnetic disk control/drive circuit 559, and further recorded in the photomagnetic disk by a photomagnetic disk recorder 560.

Also, when the original image code information detected by the original mark detecting unit 553 and the disk code information detected by the disk mark detecting unit 555 are unmatched in the mark comparator 556 (including an instance where code information is detected by the original mark detecting unit 553 but not detected by the disk mark detecting unit 555), no image data from the image memory 552 is transmitted, a message indicating unrecordable read original appears through the image display/output interface circuit 557 on the display 563. This message is prestored in a memory (not shown).

Retrieval information of a read image is input through the operation board 562, so that retrieval information corresponding to read image is written through a retrieval control circuit 561 and a photomagnetic disk control/drive circuit 559 into the photomagnetic disk by means of the photomagnetic disk unit 560. The input of retrieval information is performed either before or after the input of an original image.

Also, signals for enabling the image file apparatus to make various operations can be entered through this operation board 562.

A process for reading the image recorded into the disk is performed by the photomagnetic recording unit 560, whereby the read image data is transmitted to the photomagnetic control/drive circuit 559. And the image data is further transmitted to the image data expansion circuit 558b of the image data compression/expansion circuit 558 for the expansion processing, and then transmitted to the image display/output interface circuit 557 to appear on the display 563.

The above series of operations is controlled by CPU (not shown).

While in the above process, when the original side code information and the disk side code information are matched, or when no code information is provided on the original side, the recording is allowed into the disk, it will be appreciated that the recording may be allowed only if the originals are provided with code information.

In this case, only predetermined originals can be recorded into a specific disk, and therefore one can prevent a disk from being recorded by mistake by other persons by setting a mark of one's own.

As described above, the recording operation into the disk after comparison between the code information attached on the original side and the code information attached on the disk side may be optionally set, as required.

Next, a ninth embodiment of the present invention will be described below. In the above-described eighth embodiment, code information indicating whether the recording of important document into the disk is permitted is attached outside of the disk, or on the protection cover, whereas in the ninth embodiment, such code information is recorded on the disk itself, like image data.

Figure 24:
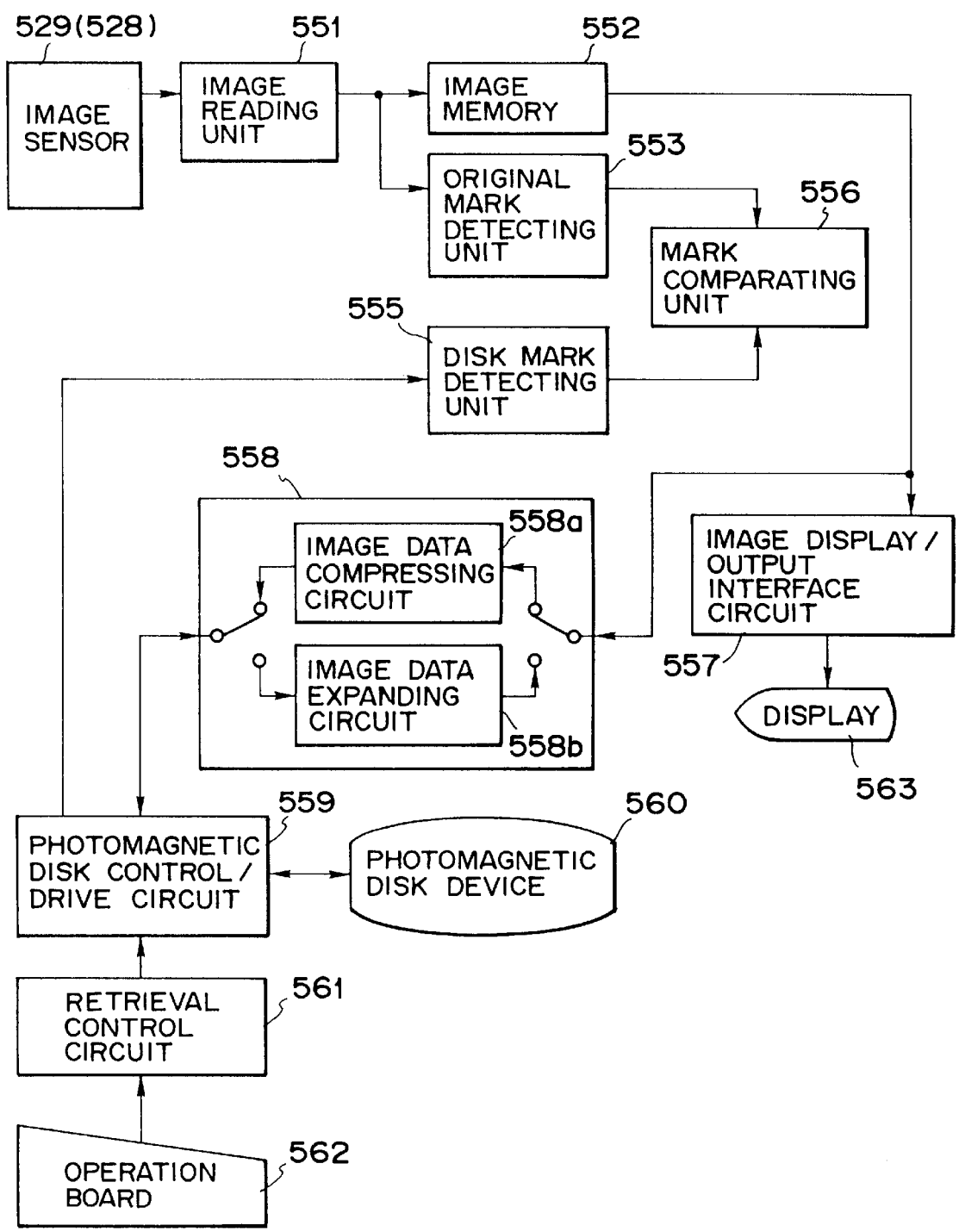
FIG. 24 is a block diagram illustrating the configuration of an image storing apparatus according to the tenth embodiment of the present invention.

FIG. 24 is a block diagram illustrating the configuration of an image file apparatus according to the ninth embodiment of the invention.

As illustrated, in this ninth embodiment, the mark reading sensor 564 and the disk mark reading unit 554 for use in reading a mark attached on the protection case are eliminated, and instead, a mark provided on the photomagnetic disk is detected by the photomagnetic disk control/drive circuit 559, and its data is transmitted to the disk mark detecting unit 555 for the detection of mark.

In order to record image data into the photomagnetic disk, the position of image data to be recorded on the disk is detected before recording of the image, whereby the initialization (hereinafter referred to as "format") of the disk must be performed.

Thus, when making the format of a photomagnetic disk by inserting it into the image file apparatus, code information corresponding to the code information attached on the original is entered through the operation board 562. This entered code information is written through a retrieval control circuit 561 and a photomagnetic disk control/drive circuit 559 onto the photomagnetic disk by the photomagnetic disk apparatus 560.

And code information corresponding to the code information written at the formatting is read from the photomagnetic disk 560 to be passed to the photomagnetic disk control/drive circuit 559 and further to the disk mark detecting unit 555 at the time when the reading operation of original image is started. And necessary code information is detected in the disk mark detecting unit 555, and the detected code information is transmitted to the mark comparator 556. And the code information is compared and collated with the code information of the original passed from the original mark detecting unit 553, so that the recording of original image into the disk is performed, as in the eighth embodiment, based on the result of comparison.

Figure 25:
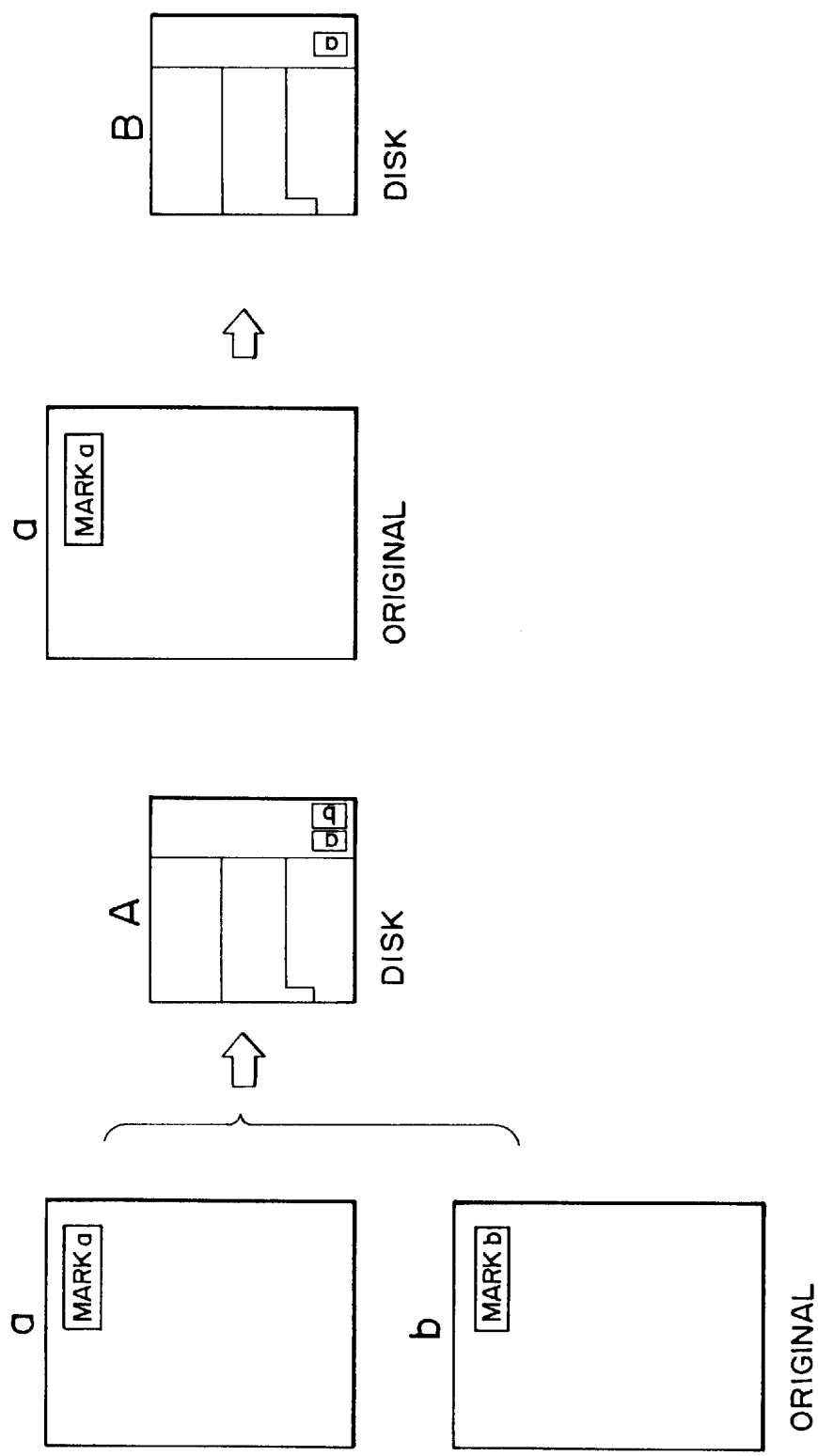
FIG. 25 is a typical view illustrating the relationship between original and photomagnetic disk in the tenth embodiment.

By the way, when the originals a, b are recorded on the disk A, and the original a is recorded on the disk B, as illustrated in FIG. 25, code information for enabling the recording of the original b must be further added to the disk A. That is, the disk permitting the recording of more types of the originals requires greater pieces of code information to be added thereto. Accordingly, in the previously-described eighth embodiment, there is a limitation on the space for attaching code information outside of the disk. However, in this ninth embodiment, code information indicating whether the recording into the disk is permitted is written in the same disk as image information, so that any limitation on the space can be ignored in practice.

Further, since the disk code information can be read from the photomagnetic disk unit 560, it is advantageous that no additional sensor for reading the code information is necessary.

Next, a tenth embodiment of the present invention will be described below.

In the previously-described embodiments, a mark (code information) indicating the specific original must be attached on a blank portion having no characters provided in the original so that the mark may be detected at the reading of original. Therefore, in some cases, there may be no blank sufficient to attach the mark.

Thus, the tenth embodiment is provided with a color mark, instead of code information.

Figure 26:
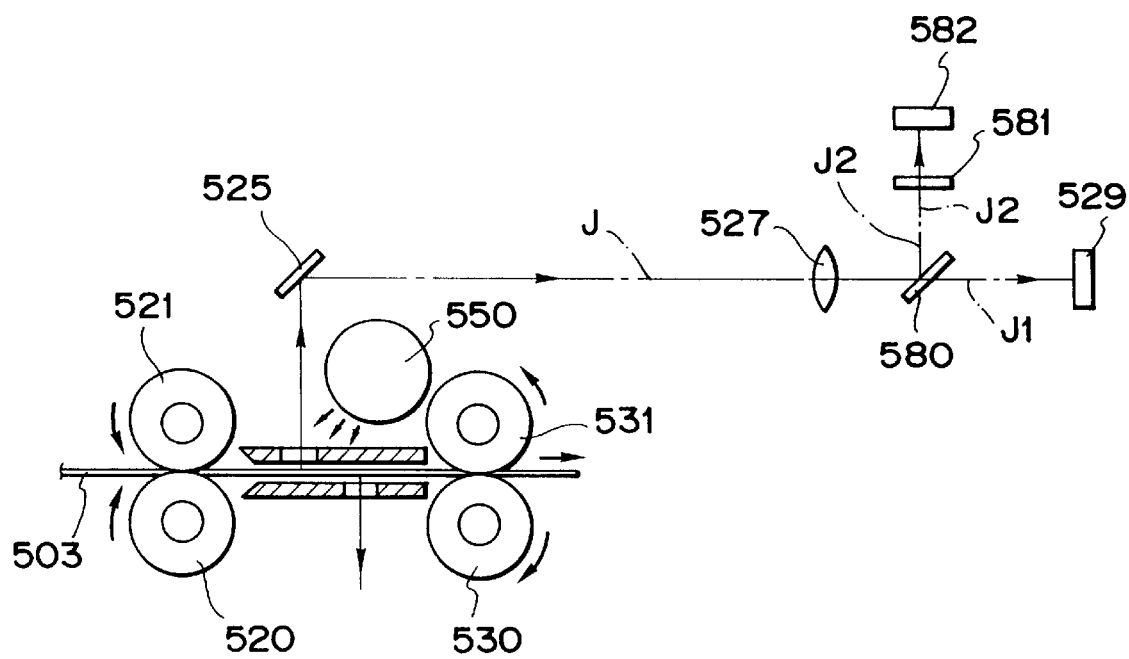
FIG. 26 is a cross-sectional view illustrating an image reading unit according to the eleventh embodiment of the invention.

FIG. 26 illustrates an image reader of an image reading unit in the tenth embodiment, especially a reader unit provided on the surface thereof.

An image light J from the surface of original 503 illuminated by an illumination lamp 550 is reflected at a plane mirror 525 and passes through an image forming lens 527 to be divided into lights J1 and J2 by a half mirror 580. An image light J1 is led to an image sensor 529 such as a CCD and an image light J2 is led through an optical filter 581 to an image sensor 582 such as a CCD. Note that the illumination lamp 550 is a light source emitting near visible light in this embodiment, which is desirably, for example, a halogen lamp.

Herein, the optical filter 581 is determined corresponding to the color of a mark attached on the original to indicate the specific original of important document. For example, if the color of mark is red, the color of filter is red.

Figure 27:
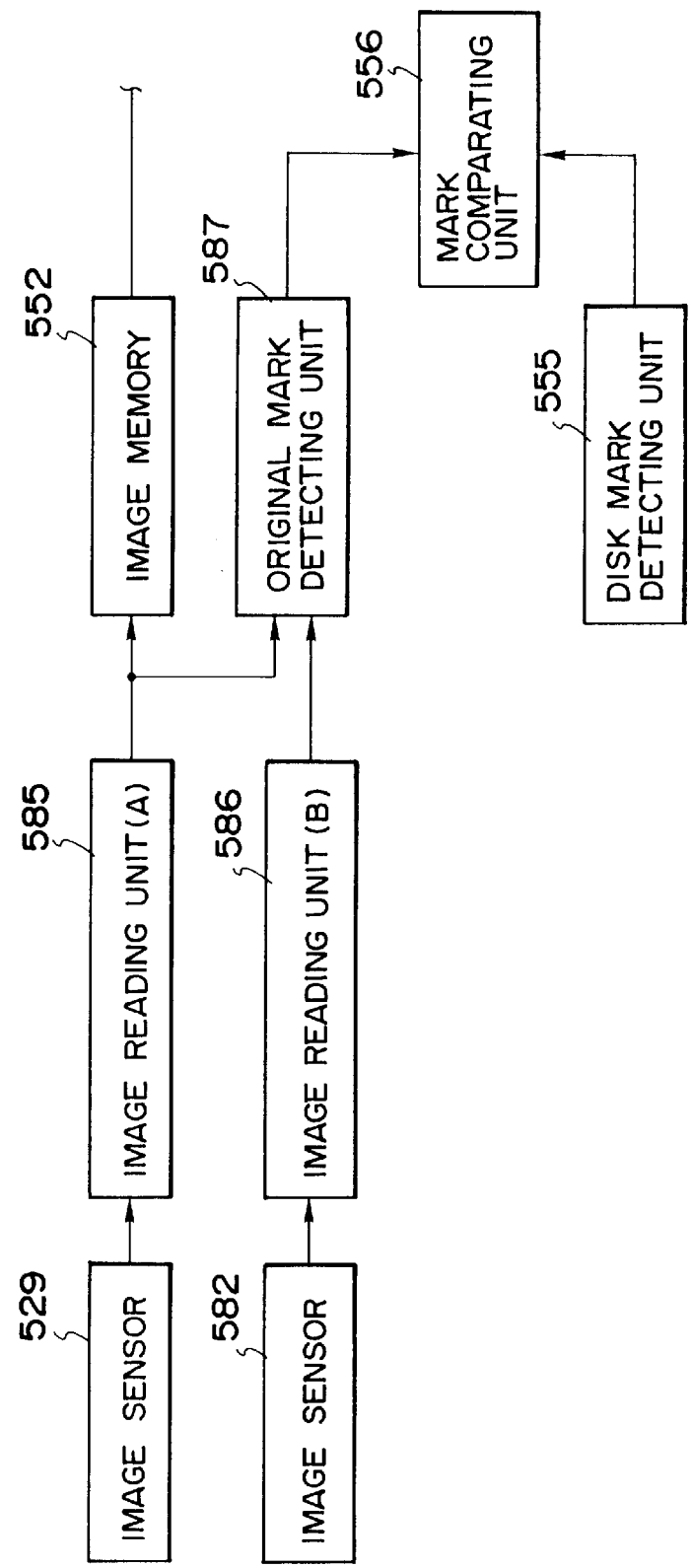
FIG. 27 is a block diagram illustrating the configuration of an image storing apparatus according to the eleventh embodiment of the invention.

FIG. 27 is a block diagram illustrating the circuit configuration of the tenth embodiment.

Image light entered without passing through the filter 581 is converted into an electrical signal by the image sensor 529 as the image including both an original image and a mark, and then digitized in an image reading unit (A) 585. On the other hand, image light entered through the filter 581 is converted into an electrical signal by the image sensor 582 as including only original image with the mark removed, and then digitized in an image reading unit (B) 586.

And an image signal digitized in the image reading unit (A) 585 is transmitted to the image memory 552 and the original mark detecting unit 587. Also, the image signal digitized in the image reading unit (B) 586 is transmitted to the original mark detecting unit 587.

Both image signals are compared in the original mark detecting unit 587, wherein the mark indicating the important document attached on the original is detected as code information.

On the other hand, the mark provided on the disk side is detected as code information by the disk mark detecting unit 555, as in the eighth or ninth embodiment.

And the original code information detected by the original mark detecting unit 587 and the disk code information detected by the disk mark detecting unit 555 are transferred to the mark comparator 556 for the comparison and collation, so that the transmission of original image data stored in the image memory 552 is controlled, based on this result, regarding whether the original image is to be recorded into the photomagnetic disk.

According to the tenth embodiment, the mark attached on the original at any location thereof can be detected by providing the mark with a color not appearing in the original, except for the special cases such as color originals. Therefore, the provision of the color with a stamp or the like results in more efficient operation.

While in the above embodiments the optical method of detecting the mark attached on the original was adopted, it will be appreciated that other methods capable of recognizing the mark may be also used, including, for example, a magnetic method. Also, other optical methods involve utilizing a light transmitted through a hole in the original.

An eleventh embodiment of the invention will be described below.

In the above-described embodiments the recording of original image onto the recording medium is controlled by comparison and collation between the original side mark and the recording medium side mark, whereas in the eleventh embodiment, the image recorded on the recording medium is restricted in respect of displaying the image for the security if the read original is provided with a mark indicating the specific security.

Figure 28:
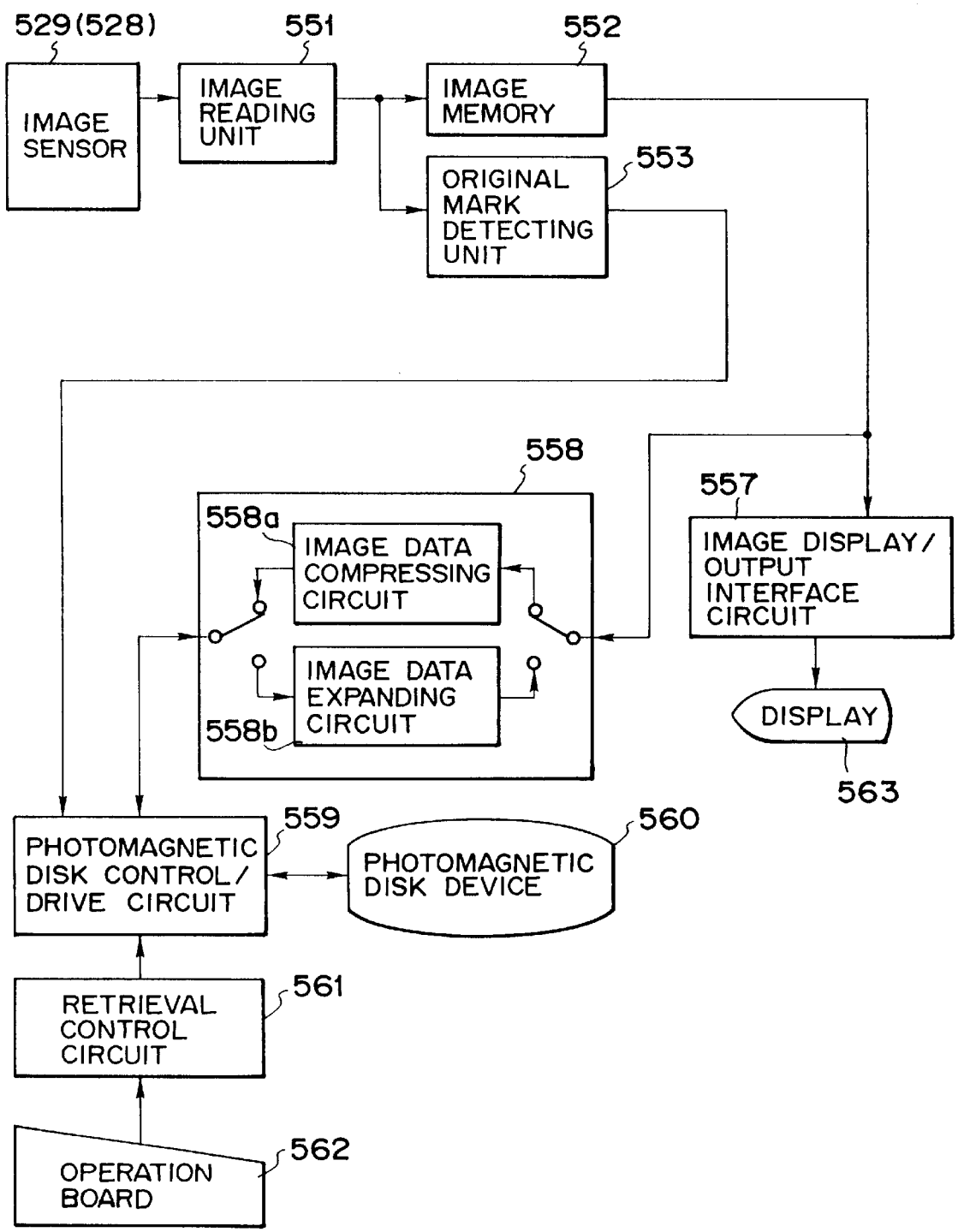
FIG. 28 is a block diagram illustrating the configuration of an image storing apparatus according to the twelfth embodiment of the invention.

FIG. 28 is a block diagram illustrating the configuration of an image file apparatus according to the eleventh embodiment of the invention. Note that in the eleventh embodiment, important originals to be read into the apparatus have recognition characters indicating the important document, as well as code information such as a bar code attached in accordance with a predetermined rule, as illustrated in FIG. 21.

In FIG. 28, an image signal read by the image sensor 529 (528) is digitized in the image reading unit 551, and transmitted as image data to the image memory 552 and the original mark detecting unit 553.

And image data stored in the image memory 552 is transmitted to the image display/output interface circuit 557 and the image data compression circuit 558a of the image data compression/expansion circuit 558. And image data transmitted to the image display/output interface circuit 557 is transmitted and displayed on the display 563. That is, the read original image is displayed substantially in real time. Also, the image data transmitted to the image data compression circuit 558a of the image data compression/expansion circuit 558 is compressed, transmitted to the photomagnetic disk control/compressed, transmitted to the photomagnetic disk control/drive circuit 559 and recorded in the photomagnetic disk by means of the photomagnetic disk recording apparatus 560.

On the other hand, if image data transmitted to the original mark detecting unit 553 has code information attached, as illustrated in FIG. 21, the code information is detected in the original mark detecting unit 553. And the detected code information is transmitted to the photomagnetic disk control/drive circuit 559, and recorded on the photomagnetic disk together with a directory indicating at what location image data is to be recorded on the disk, when the image data is recorded.

Herein, the code information attached on the original consists of a code for demanding the password and a code indicating a predetermined password corresponding to the original. Therefore, the original having code information attached is recorded on the photomagnetic disk as an image with password.

Also, image retrieval information is input from the operation board 562 to be passed to the retrieval control circuit 561 and the photomagnetic disk control/drive circuit 559, which causes retrieval information corresponding to read image to be written into the photomagnetic disk by the photomagnetic disk unit 560. The input of retrieval information is made either before or after the input of original image.

Further, signals for enabling the image file apparatus to perform various operations are also entered through the operation board 562.

Next, when reading the image recorded on the disk, retrieval information corresponding to the recorded image is input through the operation board 562. Based on this retrieval information, the directory corresponding to the image read from the photomagnetic disk unit 560 is read. Then, a check is made to determine whether or not the original has a password at the same time when the directory is read.

When the read original is original with password, a message prompting the user to enter a password appears through the image display/output interface circuit 557 on the display 563. This message is prestored in memory of the image file apparatus.

Hereby, the password is entered through the operation board 562, and when the password is matched, the image is read from the photomagnetic disk unit 560. Read image data is transmitted to the photomagnetic disk control/drive circuit 559, further to the image data expansion circuit 558b of the image data compression/expansion circuit 558 to expand the image data, and then to the image display/output interface circuit 557 to display image data on the display 563.

Also, when input password is not matched, a message indicating the unmatch of password appears on the display 563.

In this manner, by displaying retrieval image only when the password is matched, the security can be maintained.

In the eleventh embodiment, the image is displayed upon matching of the password, whereas in the twelfth embodiment of the invention, the image may be only displayed by a predetermined image file apparatus. That is, in the twelfth embodiment, when the retrieval image is an image with password, its code information is read by the photomagnetic disk unit 560, and passed through the photomagnetic disk control/drive circuit 559 to the CPU. And the CPU makes a check to determine whether or not retrieval image can be displayed in accordance with a predetermined program.

Note that whether to display the original with password may be arbitrarily set by performing a predetermined key operation through the operation board 562, for example.

In this apparatus, image data read from the photomagnetic disk unit 560, if displayable, is transmitted to the photomagnetic disk control/drive circuit 559, further to the image data expansion circuit 558b of the image data compression/expansion circuit 558 to expand the image data, and then to the image display/output interface circuit 557 to appear on the display 563.

As described above, in the twelfth embodiment, a designation of whether to display the original with password can be effected for each image file apparatus. Further, if a signal indicating whether or not image is displayed which is input through the operation board 562 is provided corresponding to the kind of password attached on the original, it is enabled not only to specify the image file apparatus capable of displaying the original with password, but also to specify the original with password to be displayed by the designated image file apparatus.

Figure 29:
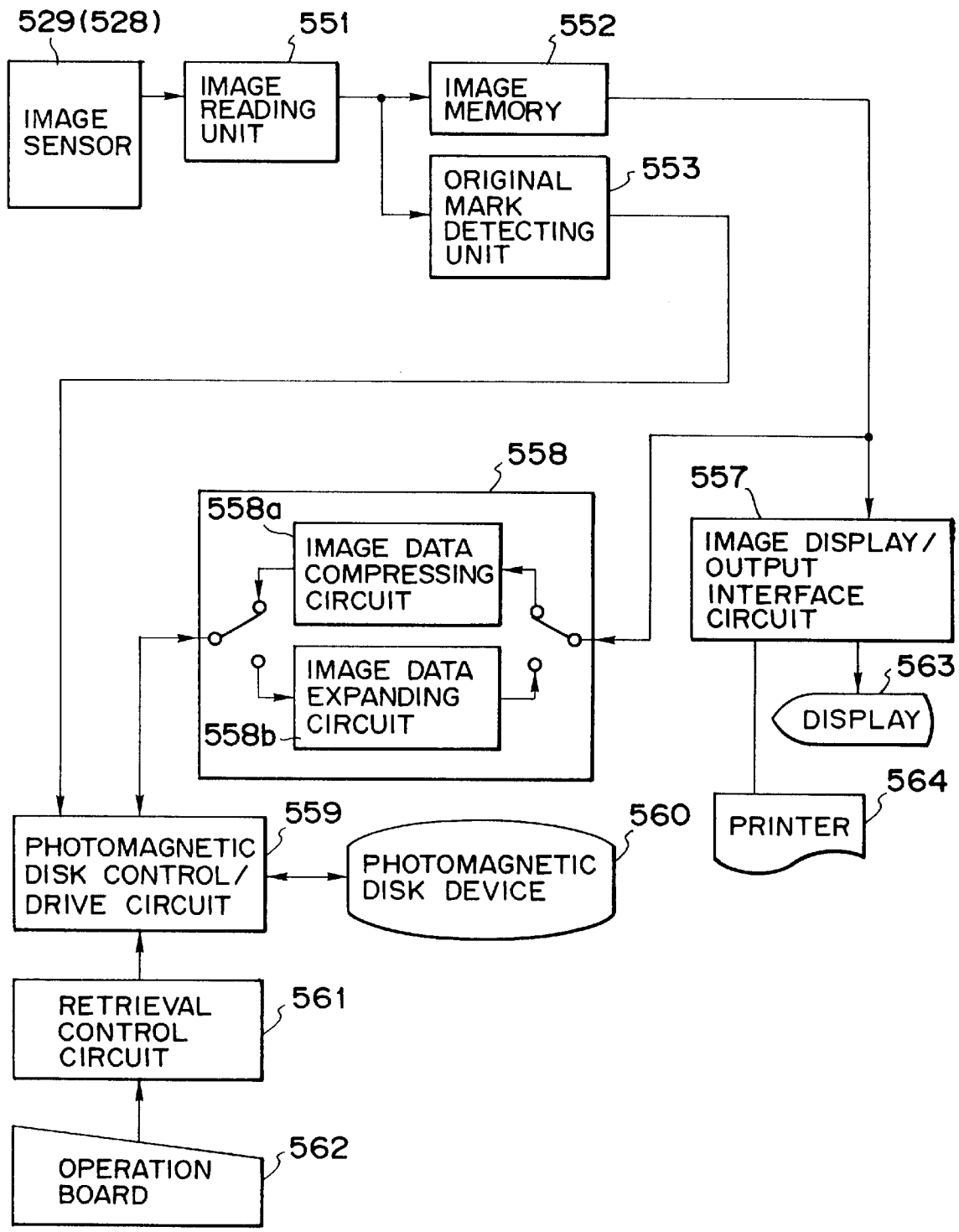
FIG. 29 is a block diagram illustrating the configuration of an image storing apparatus according to the thirteenth embodiment of the invention.

FIG. 29 is a block diagram illustrating the configuration of an image file apparatus according to the thirteenth embodiment of the invention.

The image file apparatus in the thirteenth embodiment has a printer 564 for outputting an image recorded on the photomagnetic disk onto the paper or the like. Namely, in this embodiment, the retrieved image is displayed on the display 563, and printed out by the printer 564, as required, wherein there may be possible cases where the originals can be displayed but must be inhibited from being printed out, but such originals can be controlled by using the password. Note that the output of image to the printer 564 can be started by an input signal from the operation board 562.

When the retrieved original image has a password, the original image can be displayed on the display 563 by entering a password corresponding to the original through the operation board 562, as previously described. When the displayed image is inhibited from being printed out, code information indicating the password read by the photomagnetic disk unit 560 is transmitted through the photomagnetic disk control/drive circuit 559 to the CPU. And in the CPU, a check is made to determine whether or not the retrieved image can be printed out in accordance with a predetermined program. And, based on the result, if the image can be printed out, a signal designating the print-out operation is transmitted through the operation board 562. Also, if the image can not be printed out, an error message appears on the display 563.

In the image file apparatus, a signal designating whether the image can be printed out is input beforehand through a predetermined operation of the operation board 562.

Also, when the print-out of an image is disenabled, the print-out may be enabled by entering a password instead of displaying an error message.

As described above, a specific original is allowed to be recorded on a particular recording medium at will. Accordingly, the important document can be protected from being recorded in error on the unmanaged disk during the recording, resulting in the security protection function being improved.

Also, when an image recorded on the recording medium is called and displayed, the display of the image is limited in accordance with the condition of an input password to improve the security protection function. Further, by permitting the display only on the particular apparatus, the security protection function can be further improved such as permitting access to image only at the particular place.

What is claimed is:

1. An image storing apparatus, comprising:

reading means for reading an original image;

storing means for storing the read image from said reading means into a recording medium;

first recognition means for recognizing identification information on the original image; and second recognition means for recognizing identification information attached to said recording medium;

wherein said storing means controls whether the storing of the read image is permitted, based on recognition results of said first recognition means and said second recognition means.

2. An image storing apparatus according to claim 1, wherein said recording medium is detachable from said image storing apparatus.

3. An image storing apparatus according to claim 2, wherein said second recognition means makes recognition in a state where said recording medium is mounted.

4. An image storing apparatus according to claim 1, wherein said storing means compares recognition results of said first recognition means and said second recognition means, and controls the storing depending on whether or not the recognition results are matched.

5. An image storing apparatus, comprising:
image reading means for reading an original image;
recording means for recording the read original image on a recording medium;
image reading means for reading the recorded image on said recording medium;
display means for displaying the recorded image;
input means for inputting retrieval information with which the recorded image is read and displayed;
original recognition means for recognizing identification information provided on the original image; and
controlling the display of the recorded image retrieved corresponding to this recognition result,
wherein said display control means enables original images having no identification information attached thereto among images recorded in the recording medium to be displayed by inputting retrieval information corresponding to the original images, and original images having identification information attached thereto to be displayed by inputting a predetermined condition together with retrieval information of the original images.

6. An image storing apparatus according to claim 5, wherein said identification information is indicative of an important document.

7. An image storing apparatus, comprising:
first reading means for reading an original containing identification information to provide an image;
storing means for storing the image from said first reading means into a recording medium;
first recognition means for recognizing the identification information of the original from the image;
second reading means for reading identification information from said recording medium; and
second recognition means for recognizing the identification information read by said second reading means,
wherein said storing means controls whether the storing of the image is permitted based on recognition results of said first recognition means and said second recognition means.

8. An image storing apparatus according to claim 7, wherein said recording medium is detachable from said image storing apparatus.

9. An image storing apparatus according to claim 8, wherein said second recognition means is operative when said storing medium is attached to said image storing apparatus.

10. An image storing apparatus according to claim 7, wherein said storing means compares the recognition results of said first recognition means and said second recognition means, and controls the storing depending on whether or not the recognition results are matched.

11. An image storing method, comprising the steps of:
first reading an original containing identification information to provide an image;
storing the image from said first reading step into a recording medium;
first recognizing the identification information of the original from the image;
second reading identification information from said recording medium; and
second recognizing the identification information read by said second reading step,
wherein said storing step controls whether the storing of the image is permitted based on recognition results of said first recognition step and said second recognition step.

12. An image storing method according to claim 11, wherein said recording medium is detachable from an image storing apparatus.

13. An image storing method according to claim 12, wherein said second recognition step is operative when said storing medium is attached to the image storing apparatus.

14. An image storing method according to claim 11, wherein said storing step compares the recognition results of said first recognition step and said second recognition step, and controls the storing depending on whether or not the recognition results are matched.

15. An image storing method, comprising the steps of:
reading an original image;
recording the read original image on a recording medium;
reading the recorded image on the recording medium;
displaying the recorded image;
inputting retrieval information with which the recorded image is read and displayed;
recognizing identification information provided on the original image; and
controlling the display of the recorded image retrieved corresponding to this recognition result,
wherein said controlling step enables original images having no identification information attached thereto among images recorded in the recording medium to be displayed by inputting retrieval information corresponding to the original images, and original images having identification information attached thereto to be displayed by inputting a predetermined condition together with retrieval information of the original images.

16. An image storing method according to claim 15, wherein said identification information is indicative of an important document.

17. An image storing method in an image storing apparatus, comprising the steps of:
reading an original image;
storing the read image from said reading step into a recording medium;
first recognizing identification information on the original image; and
second recognizing identification information attached to said recording medium;
wherein said storing step controls whether the storing of the read image is permitted, based on recognition results of said first recognizing step and said second recognizing step.

18. An image storing method according to claim 17, wherein said recording medium is detachable from said image storing apparatus.

19. An image storing method according to claim 18, wherein said second recognizing step makes recognition in a state where said recording medium is mounted.

20. An image storing apparatus, comprising:

reading means for reading an original image;

storing means for storing the read image from said reading means into a recording medium;

first recognition means for recognizing identification information of the original image; and second recognition means for recognizing identification information attached to said recording medium, wherein said storing means controls whether storing of the read image is permitted, based on recognition results of said first recognition means and said second recognition means.

21. An image storing apparatus according to claim 20, wherein said recording medium is detachable from said image storing apparatus.

22. An image storing apparatus according to claim 21, wherein said second recognition means makes recognition in a state where said recording medium is mounted.

23. An image storing apparatus according to claim 20, wherein said storing means compares recognition results of said first recognition means and said second recognition means, and controls the storing depending on whether or not the recognition results are matched.

24. An image storing method in an image storing apparatus, comprising the steps of:

reading an original image;

storing the read image from said reading step into a recording medium;

first recognizing identification information of the original image; and second recognizing identification information attached to said recording medium, wherein said storing step controls whether the storing of the read image is permitted, based on recognition results of said first recognition step and said second recognition step.

25. An image storing method according to claim 24, wherein said storing step compares recognition results of said first recognition step and said second recognition step, and controls the storing depending on whether or not the recognition results are matched.

26. An image storing method according to claim 24, wherein said recording medium is detachable from the image storing apparatus.

27. An image storing method according to claim 26, wherein said second recognition step makes recognition in a state where said recording medium is mounted.

* * * * *

UNITED STATES PATENT AND TRADEMARK OFFICE
CERTIFICATE OF CORRECTION

PATENT NO. : 5,822,083
DATED : October 13, 1998
INVENTOR(S) : MASAHIKO ITO ET AL.

It is certified that error appears in the above-identified patent and that said Letters Patent is hereby corrected as shown below:

COLUMN 2

Line 13, "original" should read --originals--.

COLUMN 8

Line 10, "apparatus 2" should read --apparatus 102--.

COLUMN 10

Line 9, "apparatus 72" should read --apparatus 73--.

COLUMN 20

Line 31, "read-and" should read --read and--.

Signed and Sealed this

Thirteenth Day of July, 1999

Attest:

Q. TODD DICKINSON

Attesting Officer

Acting Commissioner of Patents and Trademarks